US012343921B2

(12) United States Patent
Kurahashi et al.

(10) Patent No.: US 12,343,921 B2
(45) Date of Patent: Jul. 1, 2025

(54) DOUBLE CONTAINER AND MANUFACTURING METHOD THEREFOR, PREFORM, AND CONTAINER MANUFACTURING METHOD

(71) Applicant: KYORAKU CO., LTD., Kyoto (JP)

(72) Inventors: Yuhi Kurahashi, Yamato (JP); Shinsuke Taruno, Yamato (JP); Yosuke Muroya, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 115 days.

(21) Appl. No.: 18/248,114

(22) PCT Filed: Oct. 12, 2021

(86) PCT No.: PCT/JP2021/037747
§ 371 (c)(1),
(2) Date: Apr. 6, 2023

(87) PCT Pub. No.: WO2022/080370
PCT Pub. Date: Apr. 21, 2022

(65) Prior Publication Data
US 2023/0364847 A1 Nov. 16, 2023

(30) Foreign Application Priority Data

Oct. 15, 2020 (JP) .................................. 2020-174189
Nov. 13, 2020 (JP) .................................. 2020-189809
(Continued)

(51) Int. Cl.
*B29C 49/22* (2006.01)
*B29C 49/10* (2006.01)
(Continued)

(52) U.S. Cl.
CPC .............. *B29C 49/22* (2013.01); *B29C 49/10* (2013.01); *B65D 65/40* (2013.01); *B65D 77/06* (2013.01);
(Continued)

(58) Field of Classification Search
CPC ............ B29C 49/22; B29C 2949/0725; B29C 2949/0724; B29C 2949/3016
See application file for complete search history.

(56) References Cited

U.S. PATENT DOCUMENTS 4,174,783 A * 11/1979 Abe ........................ B29C 49/22
215/12.2
4,424,182 A * 1/1984 Cerny ............... B29C 66/43121
264/161
(Continued)

FOREIGN PATENT DOCUMENTS

CN 105764797 A 7/2016
CN 108698731 A 10/2018
(Continued)

OTHER PUBLICATIONS

Office Action issued on Oct. 10, 2023, in corresponding Japanese Application No. 2019-198246, 6 pages.
(Continued)

*Primary Examiner* — Galen H Hauth
*Assistant Examiner* — Baileigh Kate Darnell
(74) *Attorney, Agent, or Firm* — Maier & Maier, PLLC

(57) ABSTRACT

The present invention provides a double container capable of suppressing the deterioration of the gas barrier property under high humidity environment. According to the present invention, provided is a double container comprising a container body, wherein the container body has an outer shell and the inner bag, the container body is configured such that the inner bag contracts as content is reduced, and
(Continued)

the inner bag comprises an inner layer, a gas barrier layer, and an outer layer, in order from an inside of the container body.

11 Claims, 21 Drawing Sheets

(30) Foreign Application Priority Data

Jan. 27, 2021 (JP) .................................. 2021-011489
Feb. 25, 2021 (JP) .................................. 2021-028500

(51) Int. Cl.
*B65D 65/40* (2006.01)
*B65D 77/06* (2006.01)
*B65D 83/00* (2006.01)
*B29K 23/00* (2006.01)
*B29K 67/00* (2006.01)
*B29L 31/00* (2006.01)
*B65D 1/02* (2006.01)

(52) U.S. Cl.
CPC .... *B65D 83/771* (2025.01); *B29C 2949/0724* (2022.05); *B29C 2949/0725* (2022.05); *B29C 2949/3016* (2022.05); *B29K 2023/00* (2013.01); *B29K 2067/003* (2013.01); *B29L 2031/7158* (2013.01); *B65D 1/0207* (2013.01); *B65D 1/0246* (2013.01); *B65D 1/0284* (2013.01); *B65D 2565/387* (2013.01)

(56) References Cited

U.S. PATENT DOCUMENTS

| | | | | |
|---|---|---|---|---|
| 5,989,482 | A | * | 11/1999 | Sagawa ............. B29C 49/04104 425/523 |
| 2002/0182351 | A1 | * | 12/2002 | Akiyama ................ B29C 48/09 428/35.7 |
| 2005/0199577 | A1 | | 9/2005 | Tokuda et al. |
| 2006/0054635 | A1 | | 3/2006 | Iwahashi et al. |
| 2009/0174102 | A1 | | 7/2009 | Iwahashi et al. |
| 2016/0221728 | A1 | | 8/2016 | Taruno |
| 2017/0029157 | A1 | | 2/2017 | Taruno et al. |
| 2017/0036802 | A1 | | 2/2017 | Taruno |
| 2019/0070770 | A1 | | 3/2019 | Hatakeyama et al. |
| 2019/0256239 | A1 | | 8/2019 | Taruno |
| 2021/0147105 | A1 | | 5/2021 | Taruno |
| 2022/0177180 | A1 | | 6/2022 | Suzuki et al. |

FOREIGN PATENT DOCUMENTS

| | | |
|---|---|---|
| JP | S62119217 U | 7/1987 |
| JP | S6246336 B2 | 10/1987 |
| JP | 2001130599 A | 5/2001 |
| JP | 2003192031 A | 7/2003 |
| JP | 2003266527 A | 9/2003 |
| JP | 2012101486 A | 5/2012 |
| JP | 2012206736 A | 10/2012 |
| JP | 201419494 A | 2/2014 |
| JP | 2014046966 A | 3/2014 |
| JP | 201567291 A | 4/2015 |
| JP | 2015101396 A | 6/2015 |
| JP | 2016104644 A | 6/2016 |
| JP | 2016193743 A | 11/2016 |
| JP | 2017094677 A | 6/2017 |
| JP | 2017197252 A | 11/2017 |
| JP | 2018083646 A | 5/2018 |
| JP | 2019006490 A | 1/2019 |
| JP | 2019123510 A | 7/2019 |
| JP | 2020037414 A | 3/2020 |
| JP | 2020070082 A | 5/2020 |
| JP | 2020121744 A | 8/2020 |
| JP | 2020125138 A | 8/2020 |
| WO | 2004039560 A1 | 5/2004 |
| WO | 2004071887 A1 | 8/2004 |
| WO | 2015046024 A1 | 4/2015 |
| WO | 2019131416 A1 | 4/2019 |
| WO | 2020116358 A | 6/2020 |
| WO | 2020195688 A1 | 10/2020 |

OTHER PUBLICATIONS

International Search Report issued on Dec. 28, 2021, in corresponding International Application No. PCT/JP2021/037747; 8 pages.
Office Action issued on Feb. 20, 2024, in corresponding Japanese Application No. 2020-030976, 6 pages.
Partial Supplementary European Search Report issued on Feb. 22, 2024, in corresponding European Application No. 21880108.2, 12 pages.
Office Action issued on Aug. 6, 2024, in corresponding Japanese Application No. 2021-028500, 10 pages.
Office Action issued on Sep. 17, 2024, in corresponding Japanese Application No. 2021-011489, 8 pages.
Office Action issued on Sep. 17, 2024, in corresponding Japanese Application No. 2020-189809, 12 pages.
Office Action issued on Aug. 22, 2024, in corresponding Chinese Application No. 202080068814.2, 18 pages.
Office Action issued on Nov. 26, 2024, in corresponding Japanese Application No. 2021-028500, 10 pages.
Office Action issued on Dec. 17, 2024, in corresponding Japanese Application No. 2021-011489, 14 pages.

* cited by examiner

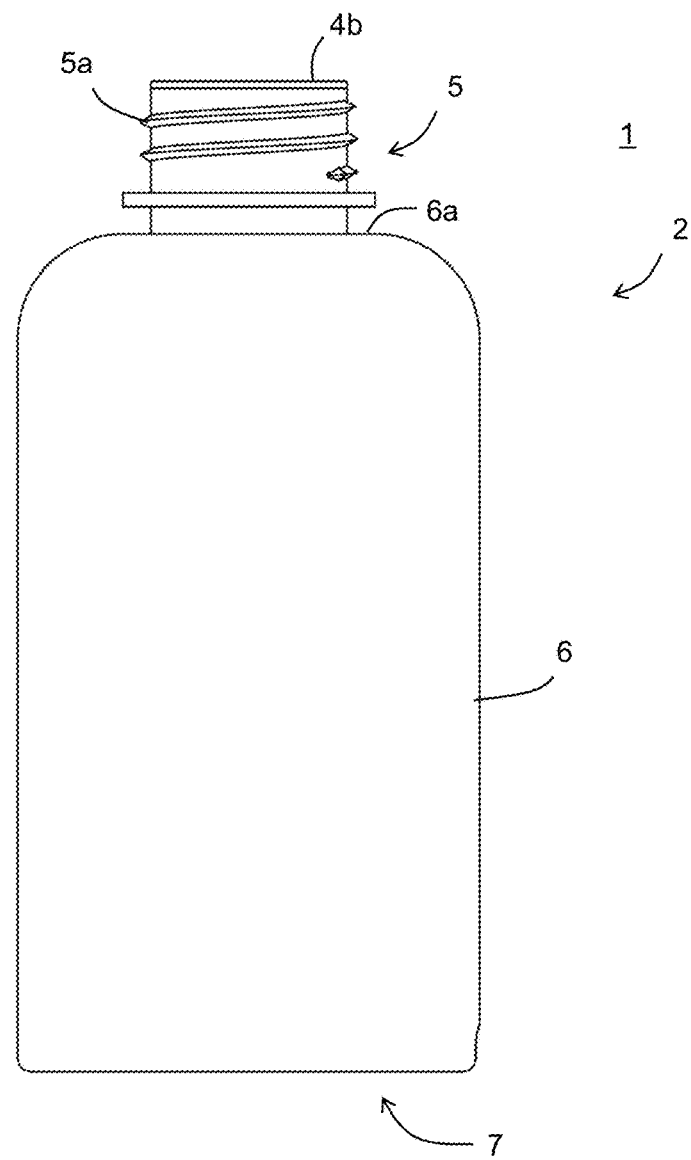
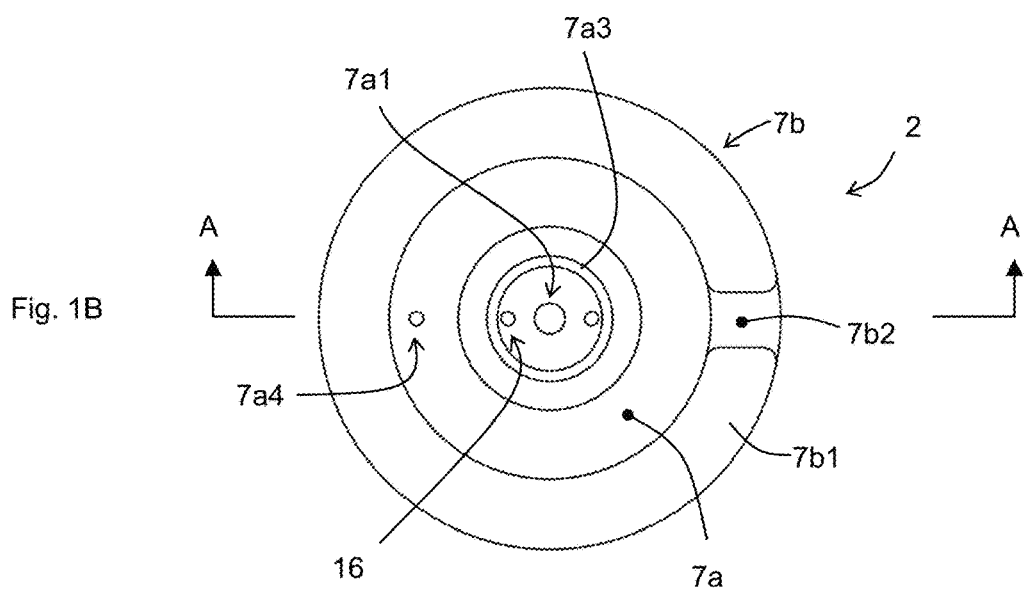
Fig. 1A
Fig. 1B

DOUBLE CONTAINER AND MANUFACTURING METHOD THEREFOR, PREFORM, AND CONTAINER MANUFACTURING METHOD

TECHNICAL FIELD

The present invention relates to a double container and a manufacturing method therefor, a preform, and a container manufacturing method.

BACKGROUND ART (First Perspective)
In Patent Literature 1, disclosed is a double container comprising a container body which has an outer shell and an inner bag and is configured such that the inner bag contracts as content is reduced.
(Second Perspective)
In Patent Literature 2, disclosed is a method of manufacturing a double container by loading a tubular molded body inside a preform and performing biaxial stretch blow molding in that state.
(Third Perspective)
In Patent Literature 3, disclosed is a method of manufacturing a double container by blow molding with an inner preform and an outer preform overlapped.

CITATION LIST

Patent Literature
[Patent Literature 1] JP-A-2015-101396
[Patent Literature 2] JP-A-2017-94677
[Patent Literature 3] WO2004/071887

SUMMARY OF INVENTION

Technical Problem (First Perspective)
The double container of Patent Literature 1 has an EVOH layer with gas barrier property. However, the inventors examined the double container of Patent Literature 1, and found that the gas barrier property of the double container of Patent Literature 1 may deteriorate under high humidity environment.

The present invention has been made by taking these circumstances into consideration. The present invention provides a double container capable of suppressing the deterioration of the gas barrier property under high humidity environment.
(Second Perspective)
Since a tubular molded body is molded by direct blow molding, it has a pinch-off part at the bottom. Since the strength of the pinch-off part is relatively weak, when biaxial stretch blow molding is performed with such a tubular molded body loaded inside the preform, the pinch-off part of the tubular body may cleave by being stretched vigorously.

The present invention has been made by taking these circumstances into consideration. The present invention provides a preform capable of suppressing cleaving of the pinch-off part when biaxial stretch blow molding is performed.
(Third Perspective)
An inner bag is configured by an inner preform, and an outer shell is configured by an outer preform. The inner bag contracts as content in the inner bag is reduced, but the outer shell is maintained in its original state by introducing outside air into the intermediate space between the inner bag and the outer shell through an outside air introduction hole provided on the outer shell.

In such a double container, it was found that it is sometimes difficult to introduce outside air into the intermediate space between the inner bag and the outer shell.

The present invention has been made by taking these circumstances into consideration. The present invention provides a double container capable of smoothly introducing outside air into the intermediate space between the inner bag and the outer shell.

Solution to Problem (First Perspective)
According to the present invention, provided is a double container comprising a container body, wherein the container body has an outer shell and an inner bag, the container body is configured such that the inner bag contracts as content is reduced, and the inner bag comprises an inner layer, a gas barrier layer, and an outer layer, in order from an inside of the container body.

The inventors conducted an intensive study and found that in the double container of Patent Literature 1, since outside air enters the intermediate space between the outer shell and the inner bag as content is discharged, the EVOH layer that is the outermost layer of the inner bag is exposed to the outside air, by which the gas barrier property under high humidity environment may be reduced as a result. Based on this finding, the inventors found that the exposure of the gas barrier layer to moisture contained in the content or outside air is suppressed by putting the gas barrier layer of the inner bag between the inner layer and the outer layer, thereby leading to the completion of the present invention.

Hereinafter, various embodiments of the present invention are exemplified. The embodiments shown below can be combined with each other.

Preferably, the double container described above, wherein a thickness of the inner bag at a center in a height direction of the container body is 80 to 200 μm, and a value of (a thickness of the gas barrier layer/a thickness of the inner bag) is 0.2 to 0.6.

Preferably, a method of manufacturing the double container described above, the method comprising a biaxial stretch blow molding step, wherein a preform is biaxially stretched by blowing air thereinto with the preform being heated and softened in the biaxial stretch blow molding step, the preform configured by covering an inner preform with an outer preform.
(Second Perspective)
According to the present invention, provided is a preform having a tubular body part and a bottom part closing a lower end of the body part, wherein the bottom part comprises a pinch-off part, and T2/T1 is greater than 1, where T1 represents a thickness of the body part on a center surface in a height direction of the preform, and T2 represents a thickness of the bottom part at a middle point between a center and an end in a longitudinal direction of the pinch-off part when the preform is viewed along a longitudinal direction of the preform from a side of the bottom part.

In the preform of the present invention, since the thickness of the bottom part is larger than that of the body part, stretching of the bottom part of the preform is suppressed when biaxial stretch blowing is performed. When stretching of the bottom part is suppressed, stretching at the pinch-off part provided on the bottom part is also suppressed, thereby suppressing the pinch-off part from cleaving.

Hereinafter, various embodiments of the present invention are exemplified. The embodiments shown below can be combined with each other.

Preferably, the preform described above, wherein T2/T1 is equal to or greater than 1.2.

Preferably, the preform described above, comprising an innermost layer, a gas barrier layer, and an outermost layer, in order from an inside of the preform.

Preferably, a preform configured by covering an inner preform with an outer preform, wherein the inner preform is the preform described above.

Preferably, the preform described above, wherein the outer preform comprises an annular protrusion part at a bottom part of the outer preform, and an end of the pinch-off part is located outside an outer edge of the annular protrusion part.

Preferably, a method of manufacturing a container, the method comprising a biaxial stretch blow molding step, wherein the preform is biaxially stretched by blowing air thereinto with the preform described above being heated and softened in the biaxial stretch blow molding step.

(Third Perspective)

According to the present invention, provided is a method of manufacturing a double container, wherein: the double container comprises a container body; the container body has an outer shell and an inner bag; the container body is configured such that the inner bag contracts as content is reduced; the outer shell comprises an outside air introduction hole for introducing outside air between the outer shell and the inner bag; the method comprises a heating step and a molding step; in the heating step, a preform configured by covering an inner preform with an outer preform is heated for softening and is put into a softened state; the molding step comprises a blow molding step of blowing air into the inner preform in the softened state; in the heating step, the preform is heated by a plurality of heaters with the preform being rotated; the plurality of heaters are arranged at a position adjacent to a side surface of the preform to align along a longitudinal direction of the preform; a part of the preform at which the outside air introduction hole is formed is defined as an outside air introduction hole formation part; among the plurality of heaters, a heater closest to the outside air introduction hole formation part is defined as a closest heater; among the plurality of heaters, heaters other than the closest heater are defined as other heaters; V is defined as a value of an output of the closest heater divided by a square of a distance from the closest heater to the outside air introduction hole formation part; Wa is defined as a maximum value among values obtained by dividing each output of the other heaters by a square of a distance from each of the other heaters to the preform; and V/Wa is 0.60 or less.

The inventors conducted intensive study and found that the outer shell configured of the outer preform and the inner bag configured of the inner preform are in very close contact with each other in the region around the outside air introduction hole, and thus outside air is not smoothly introduced into the intermediate space between the inner bag and the outer shell. Based on this finding, the inventors decreased the value of V to weaken heating at the part where the outside air introduction hole is formed, and found that degree of close contact between the outer shell and the inner bag is lowered and thus it becomes easier to introduce outside air, thereby leading to the completion of the present invention. It should be noted that the degree of close contact between the outer shell and the inner bag can also be lowered by weakening heating of the entire preform. In such cases, the entire inner bag contracts after molding, thereby its capacity easily decreased. This invention enables smooth introduction of outside air into the intermediate space while suppressing contraction of the inner bag.

Hereinafter, various embodiments of the present invention are exemplified. The embodiments shown below can be combined with each other.

Preferably, the method described above, wherein V/Wb is 0.70 or less, where Wb represents an average of values obtained by dividing each output of the other heaters by a square of a distance from each of the other heaters to the preform.

Preferably, the method described above, wherein V/Wc is 0.95 or less, where Wc represents a minimum value among values obtained by dividing each output of the other heaters by a square of a distance from each of the other heaters to the preform.

Preferably, the method described above, wherein the inner preform is configured of a material having a mold shrinkage rate larger than that of the outer preform.

Preferably, the method described above, wherein a through-hole provided on the outer preform is the outside air introduction hole formation part.

Preferably, the method described above, wherein the outer preform is not provided with a through-hole to become the outside air introduction hole, the method comprises a step of forming the outside air introduction hole by perforating a perforated part in the outer shell of the container body obtained by the molding step, and the outside air introduction hole formation part is a part to become the perforated part.

Preferably, the method described above, wherein the preform comprises a stretched part stretched in the molding step, and the heating is performed such that a temperature of the outside air introduction hole formation part is lower than that of a part in the stretched part where a temperature thereof is the highest.

BRIEF DESCRIPTION OF DRAWINGS

FIGS. 1A and 1B show a container body 2 of a double container 1, which can be manufactured by a method of manufacturing a double container of one embodiment of the present invention. FIG. 1A is a front view, and FIG. 1B is a bottom view.

Figure 6A:
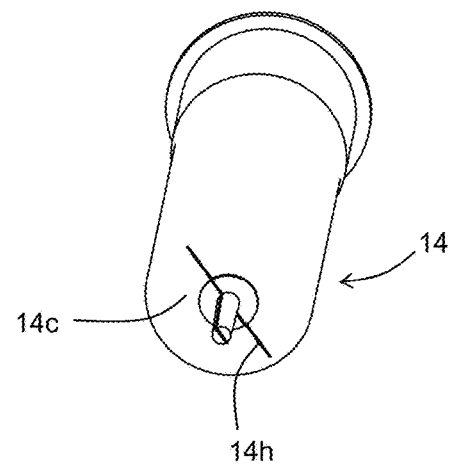
FIG. 6A is a perspective view of the inner preform 14 as viewed from a side of a bottom part 14c.
Figure 6B:
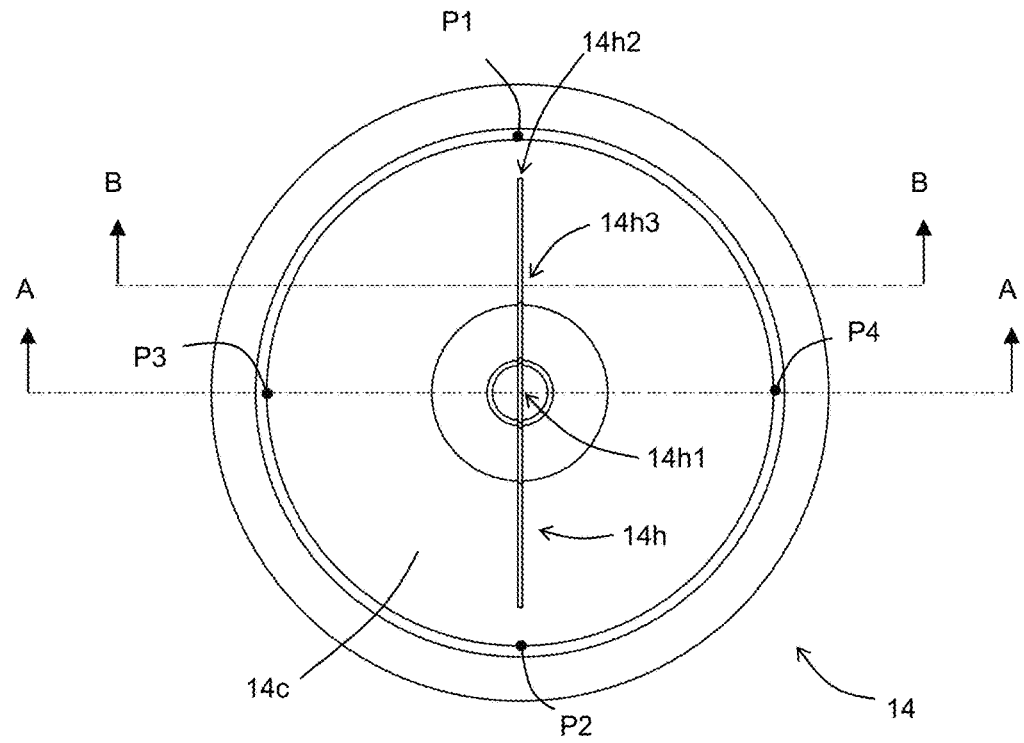
FIG. 6B is an enlarged view of a bottom view of the inner preform 14 (view of the inner preform 14 as viewed from the side of the bottom part 14c along a longitudinal direction of the inner preform 14).
Figure 8A:
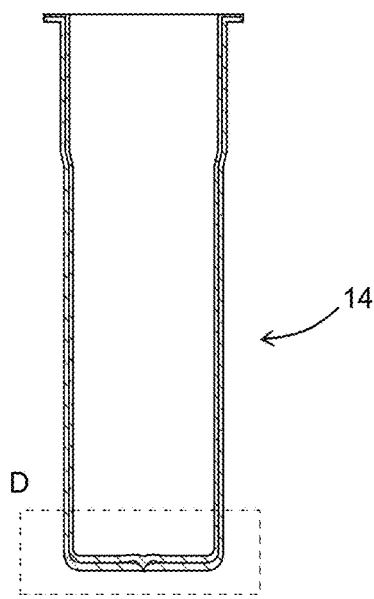

FIG. 8A is a cross-sectional view along a B-B line in FIG. 6B (cross-sectional view that passes a middle point 14h3 and is perpendicular to the longitudinal direction of the pinch-off part 14h).

Figure 8B:
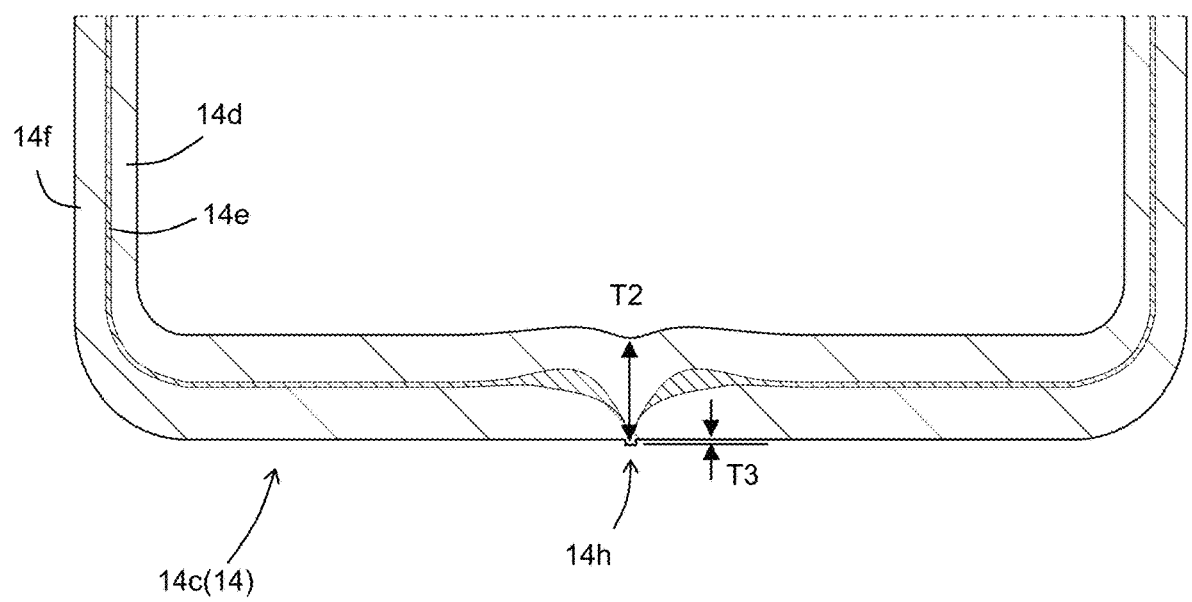

FIG. 8B is an enlarged view of a region D in FIG. 8A.

Figure 5:
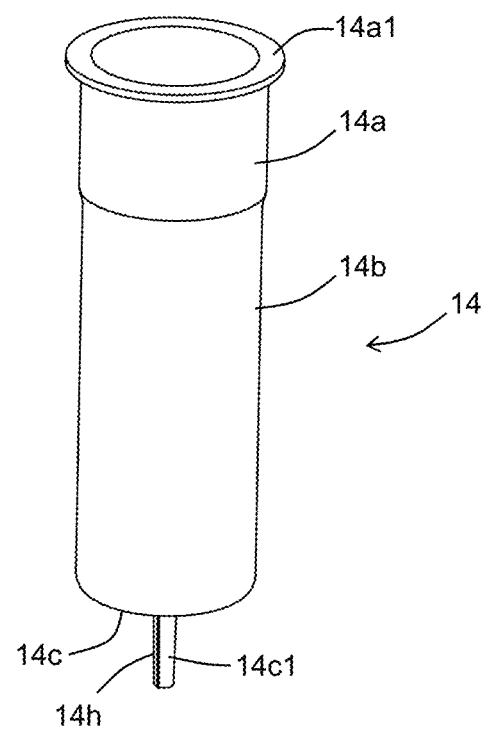
FIG. 5 is a perspective view showing a state in which an inner preform 14 and an outer preform 13 are separated.
Figure 5:
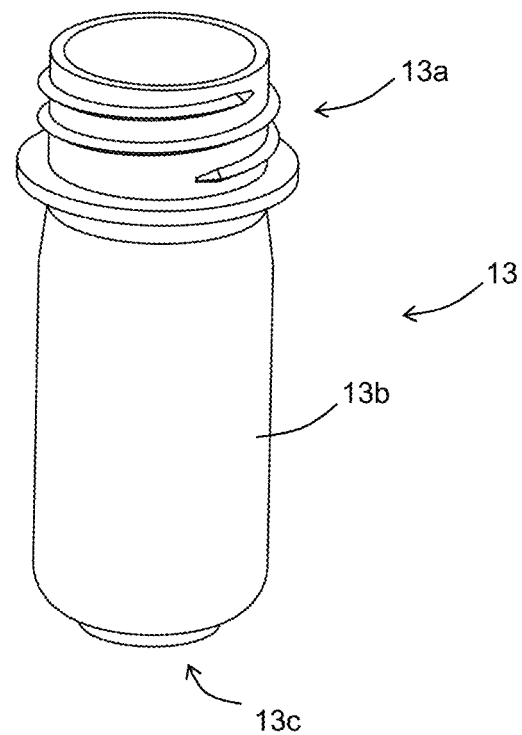
Figure 9:
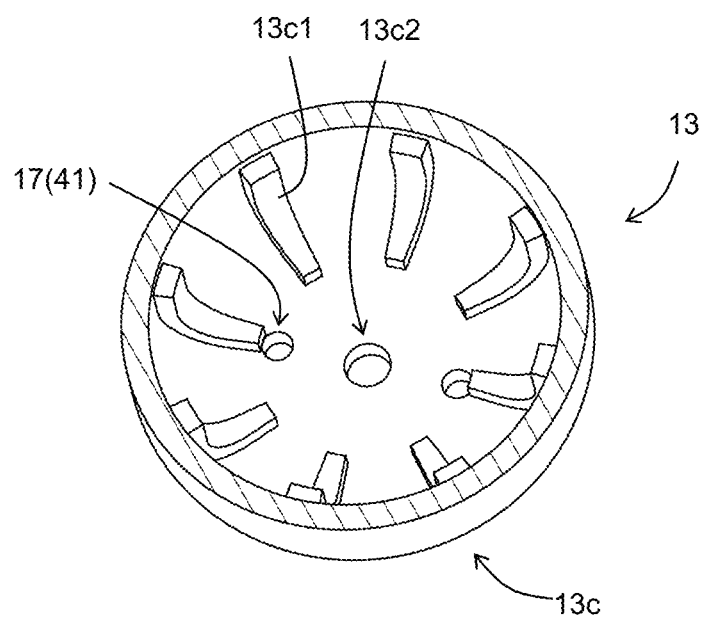

FIG. 9 is a cross-sectional perspective view of an area near a bottom 13c of the outer preform 13 in FIG. 5, as viewed from an inside of the outer preform 13.

Figure 10A:
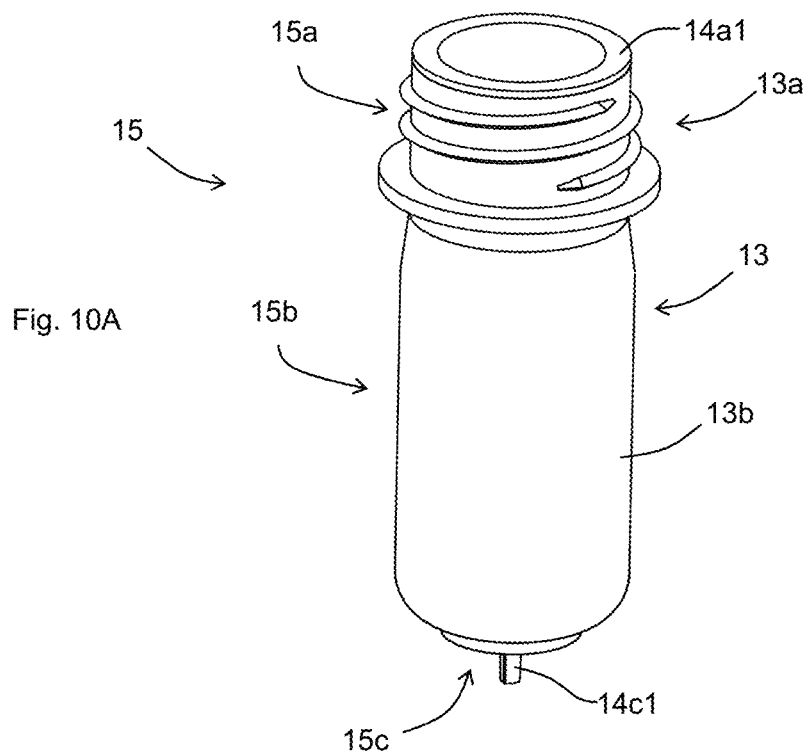

FIG. 10A is a perspective view of a preform 15 configured by covering the inner preform 14 with the outer preform 13.

Figure 10B:
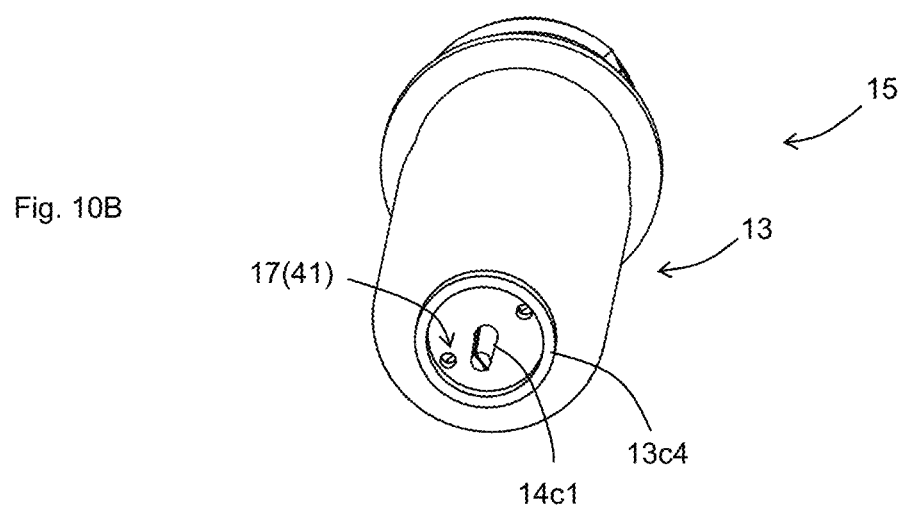

FIG. 10B is a perspective view corresponding to FIG. 10A as viewed from another angle.

Figure 11:
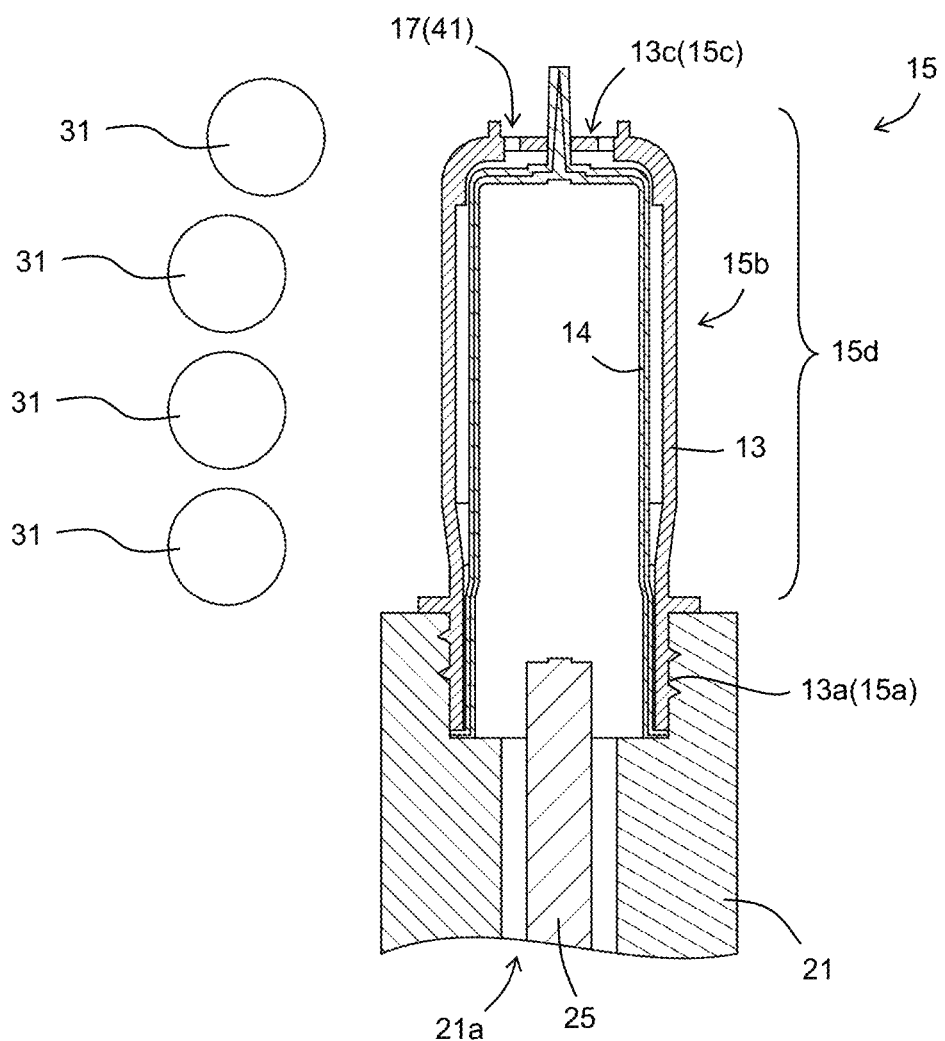

FIG. 11 is a cross-sectional view showing a state in which the preform 15 is attached to a mouth part supporting mold 21 and is close to a heater 31.

Figure 12:
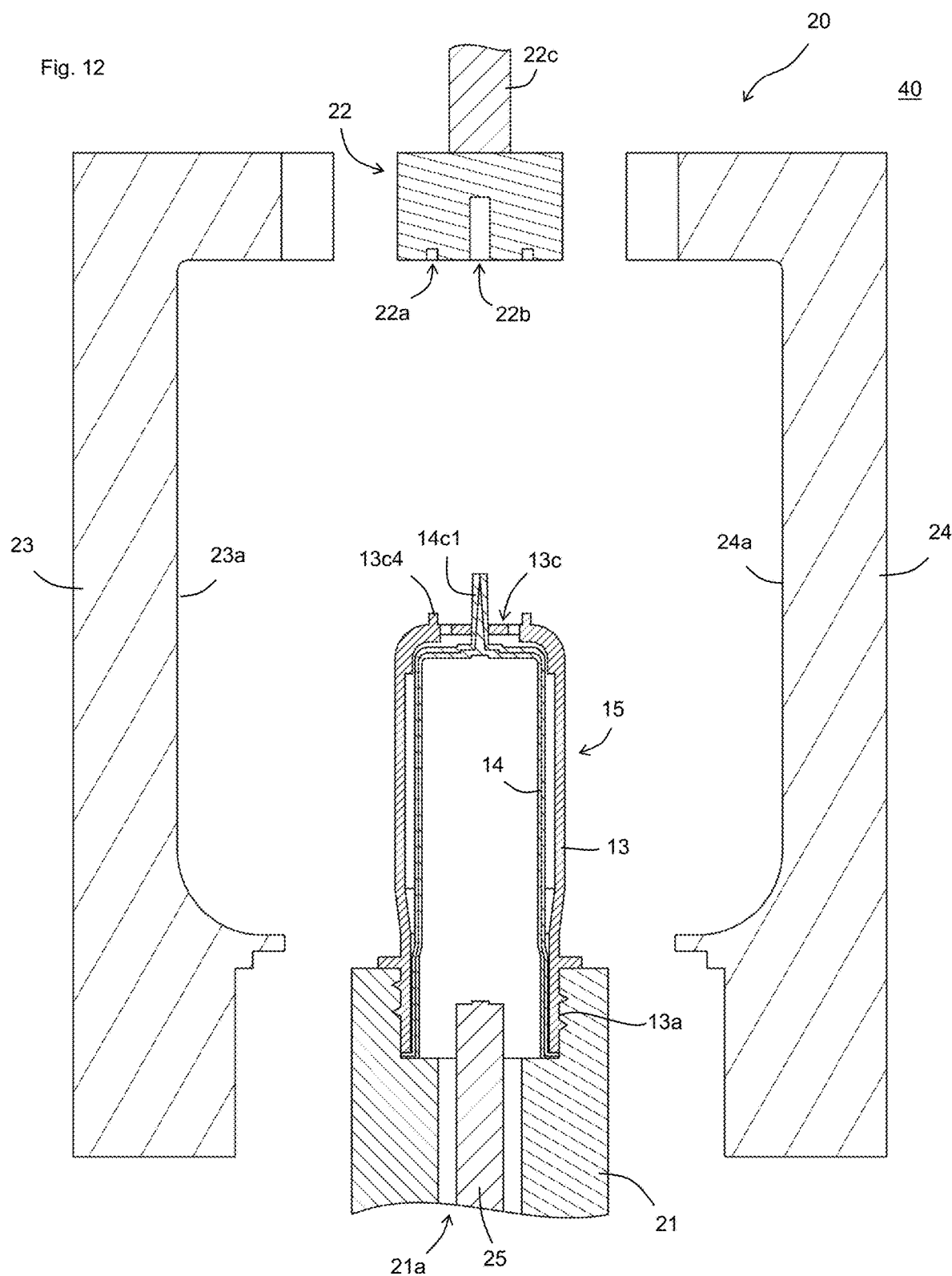

FIG. 12 is a cross-sectional view showing a state after the mouth part supporting mold 21 attached to the preform 15 is moved to a position between molds 23 and 24 from the state shown in FIG. 11.

Figure 13:
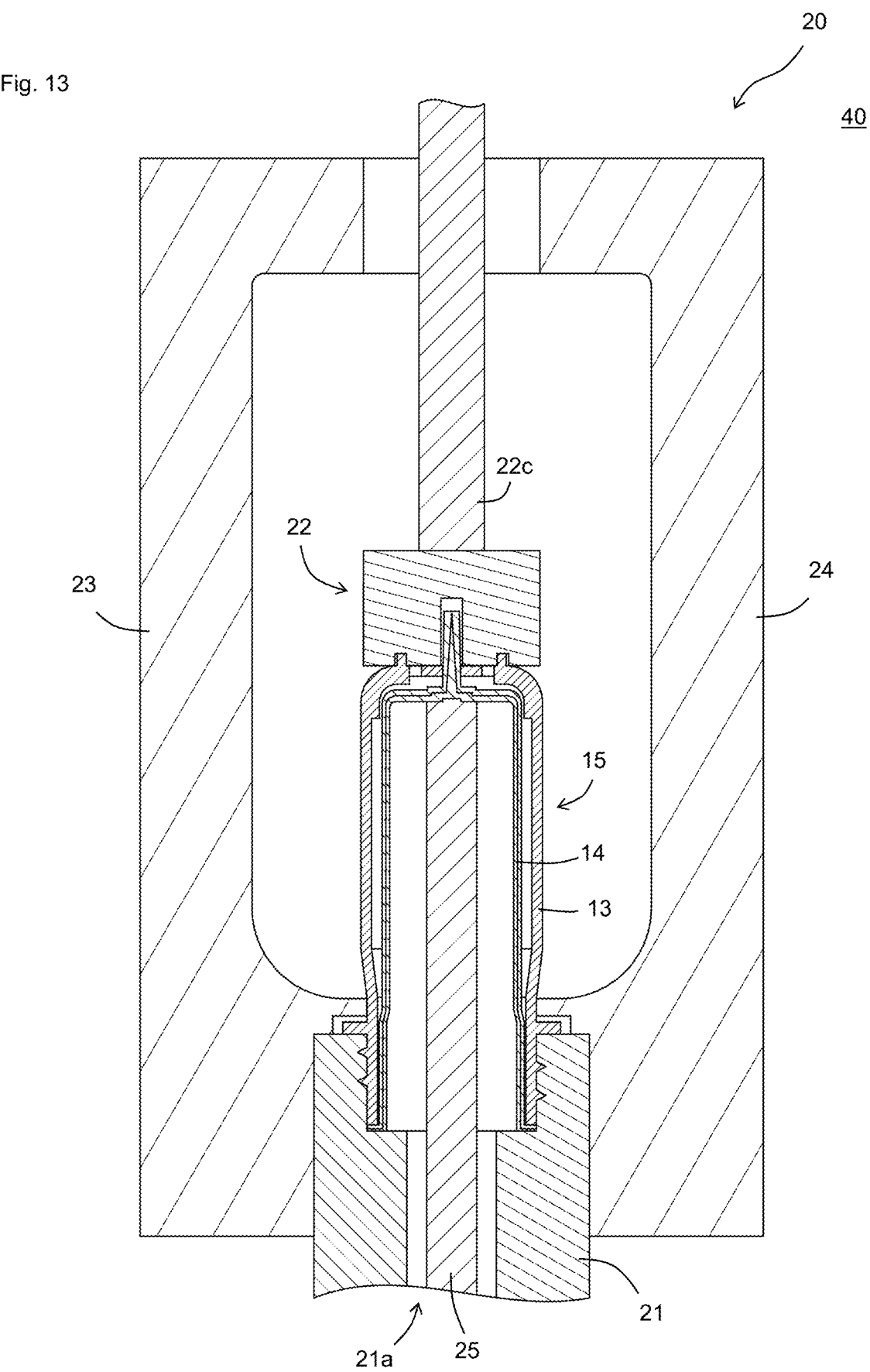

FIG. 13 is a cross-sectional view showing a state after the molds 23 and 24 are closed and the bottom part 13c of the outer preform 13 is supported by a bottom part supporting mold 22 from the state shown in FIG. 12.

Figure 14:
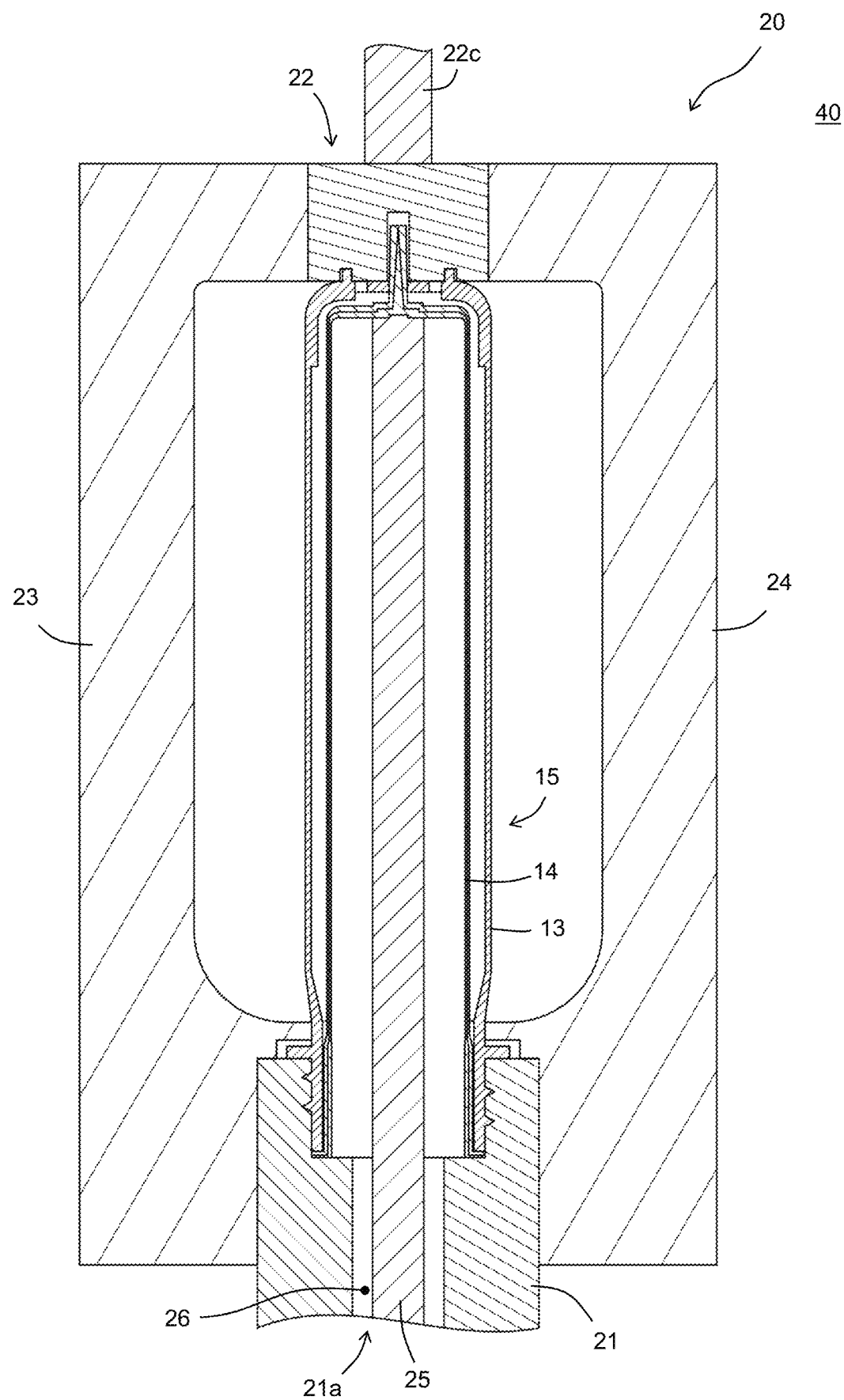

FIG. 14 is a cross-sectional view showing a state after a supporting rod 25 is extended and the bottom part supporting mold 22 is retracted to stretch the preform 15 longitudinally from the state shown in FIG. 13.

Figure 15:
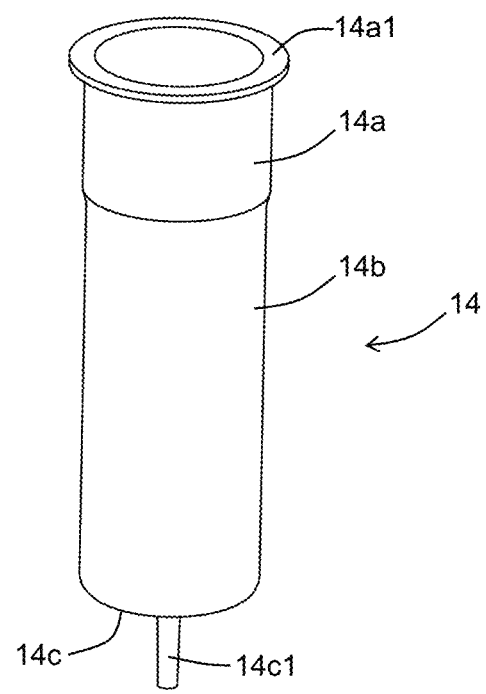
Figure 15:
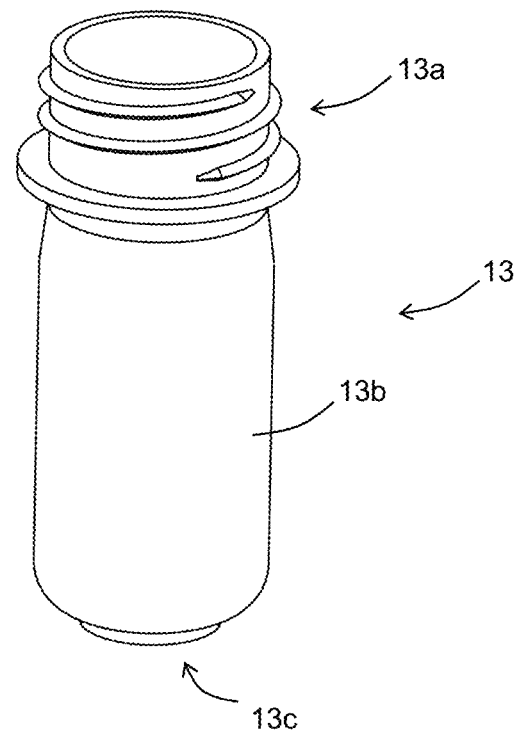

FIG. 15 is a perspective view showing a state in which the inner preform 14 and the outer preform 15 are separated.

Figure 16:
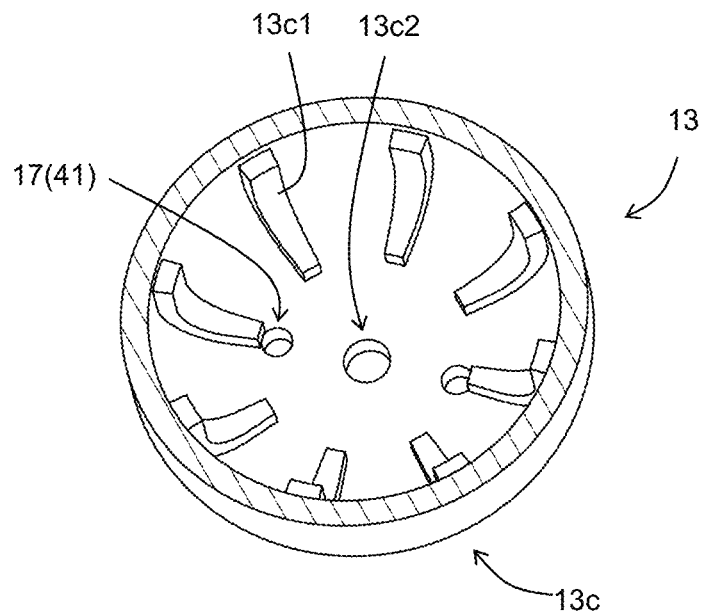

FIG. 16 is a cross-sectional perspective view of the area near the bottom part 13c of the outer preform 13 in FIG. 15 as viewed from the inside of the outer preform 13.

Figure 17A:
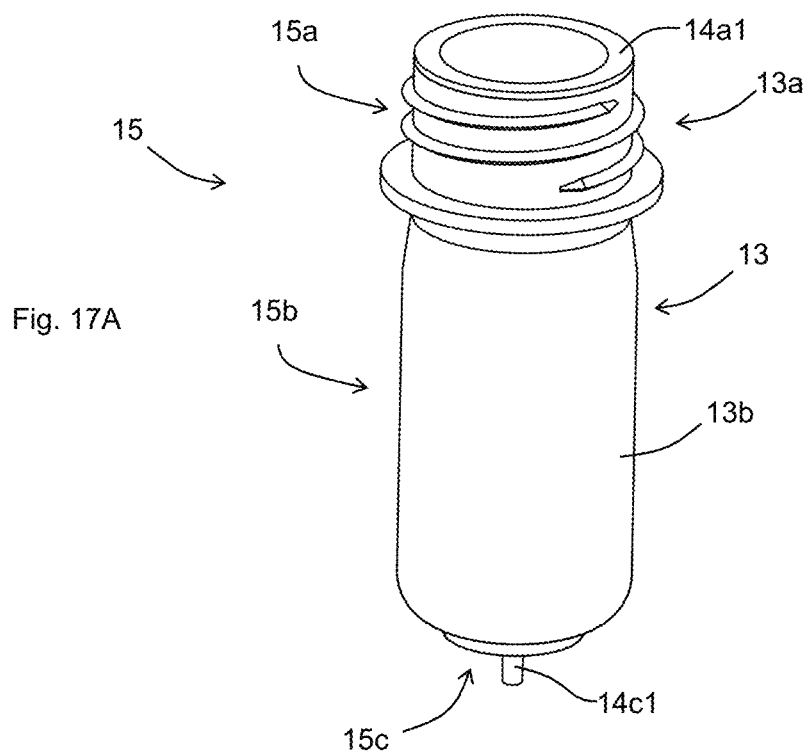

FIG. 17A is a perspective view of the preform 15 configured by covering the inner preform 14 with the outer preform 13.

Figure 17B:
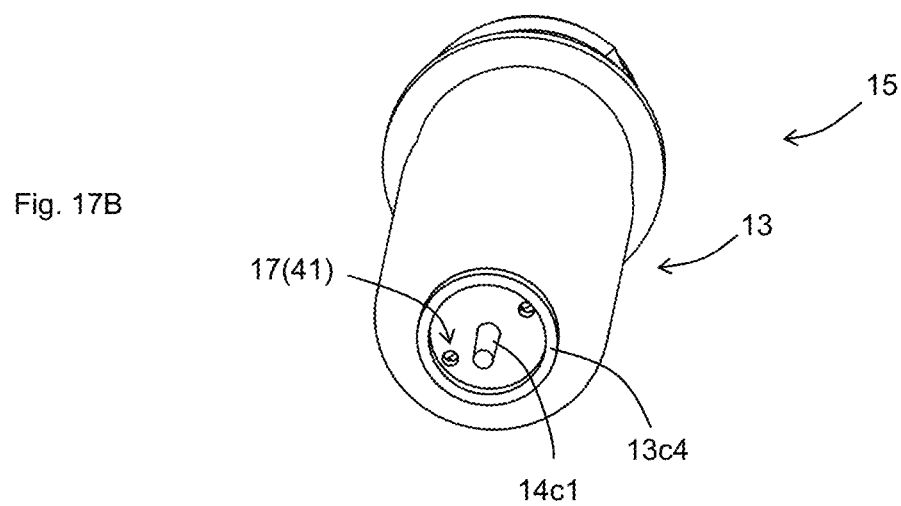

FIG. 17B is a perspective view corresponding to FIG. 17A as viewed from another angle.

Figure 18:
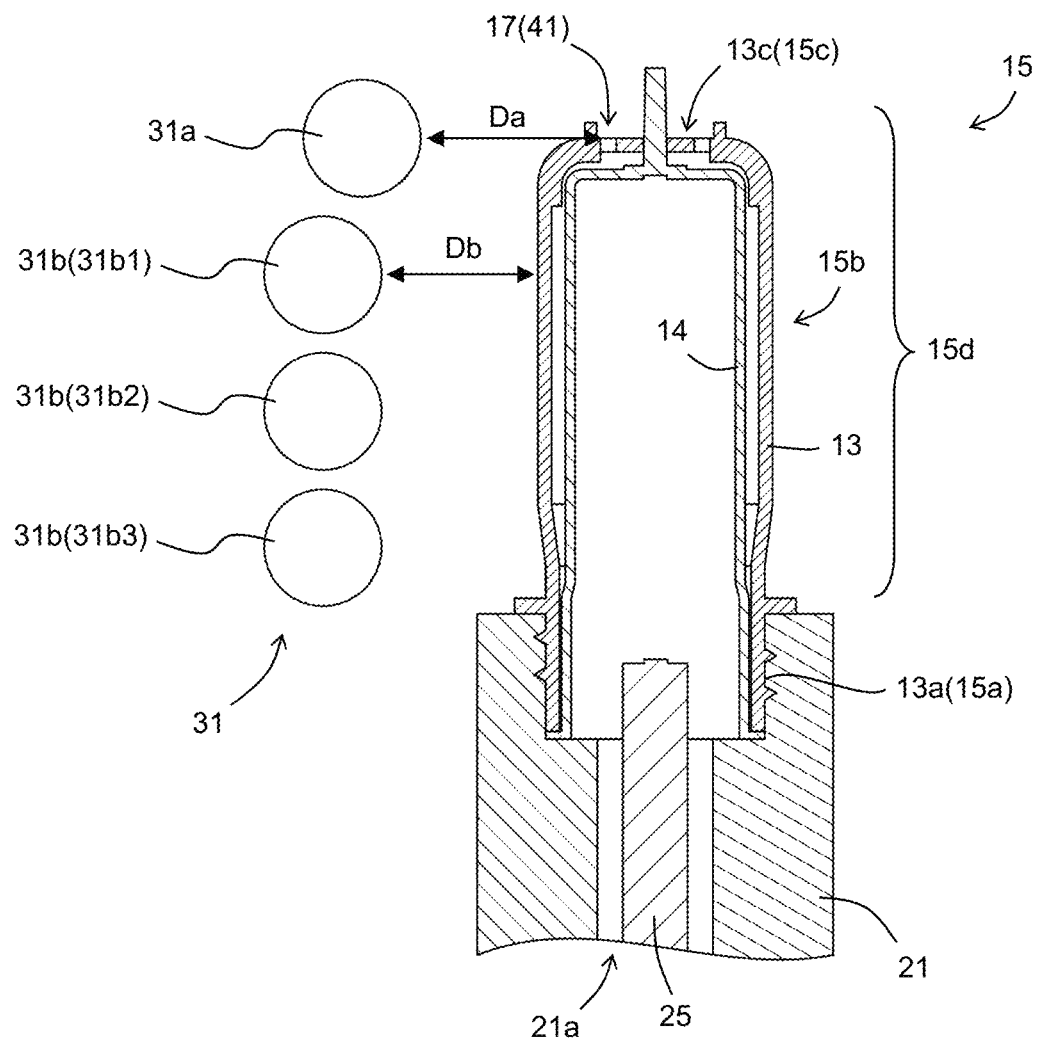

FIG. 18 is a cross-sectional view showing a state in which the preform 15 is attached to the mouth part supporting mold 21 and is close to a heater 31.

Figure 19:
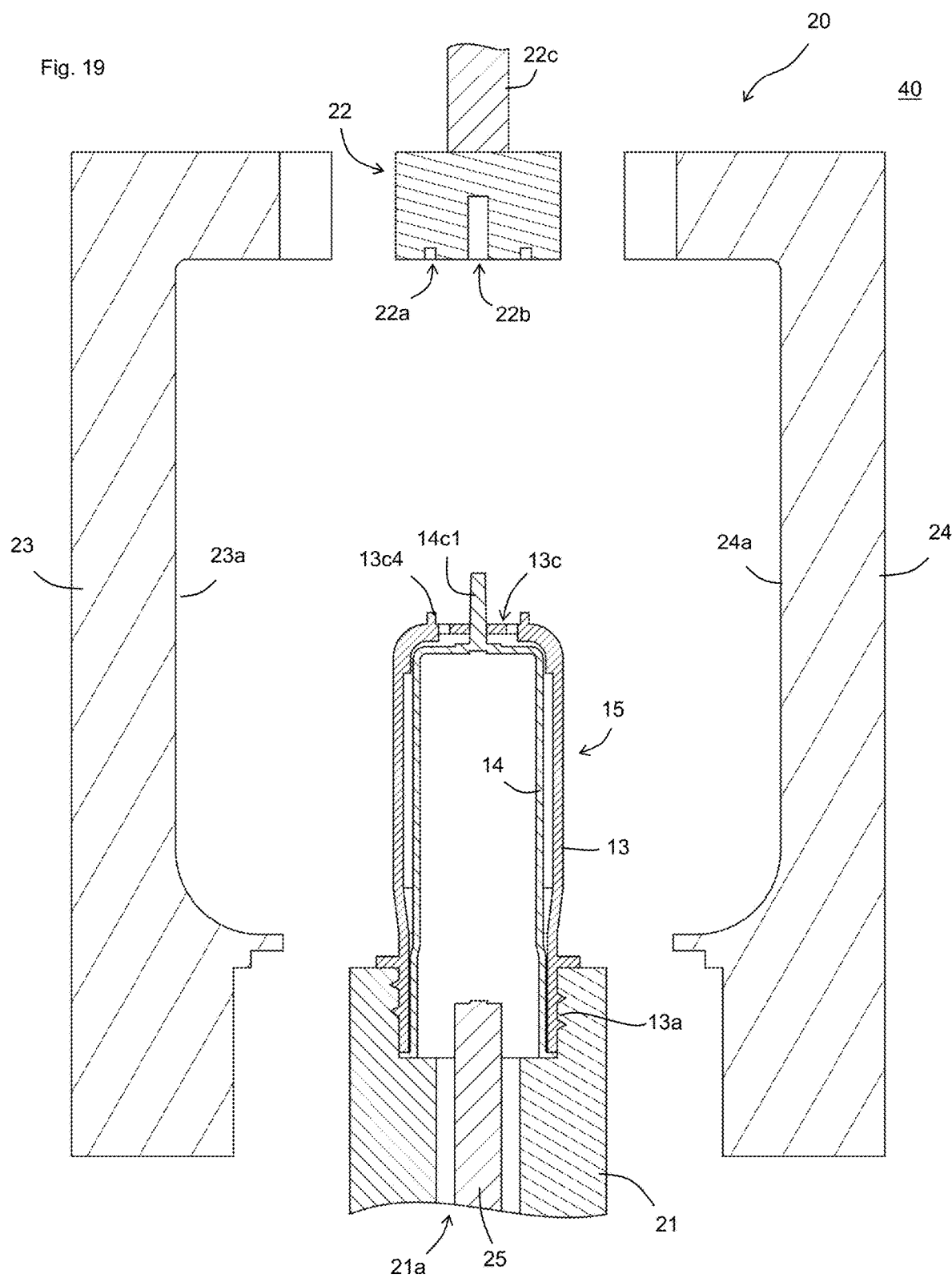

FIG. 19 is a cross-sectional view showing a state after the mouth part supporting mold 21 attached to the preform 15 is moved to a position between molds 23 and 24 from the state shown in FIG. 18.

Figure 20:
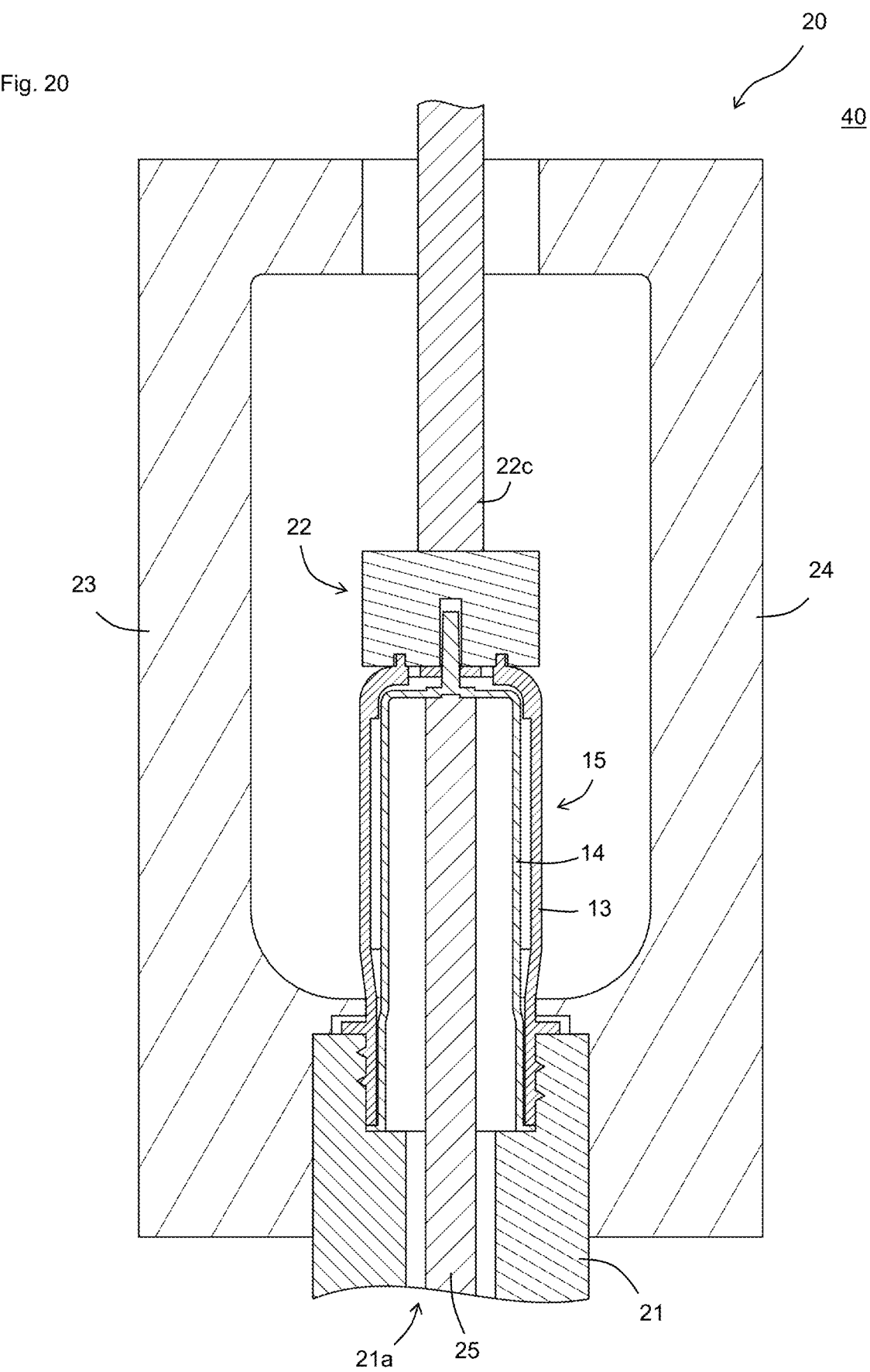

FIG. 20 is a cross-sectional view showing a state after molds 23 and 24 are closed and the bottom part 13c of the outer preform 13 is supported by the bottom part supporting mold 22 from the state shown in FIG. 19.

Figure 21:
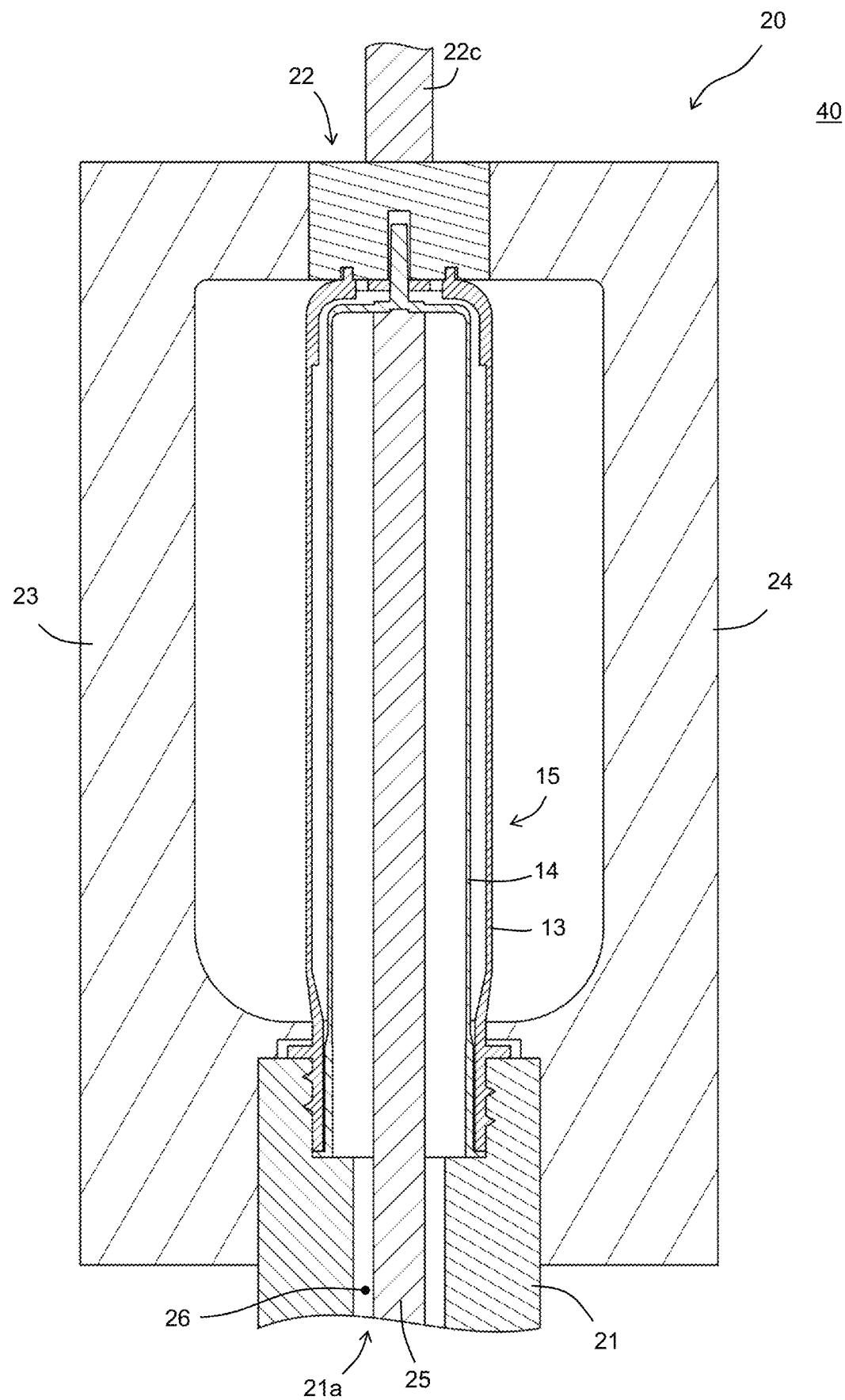

FIG. 21 is a cross-sectional view showing a state after a supporting rod 25 is extended and the bottom part supporting mold 22 is retracted to stretch the preform 15 longitudinally from the state shown in FIG. 20.

DESCRIPTION OF EMBODIMENTS

Hereinafter, embodiments of the present invention will be described. Various distinctive features shown in the following embodiments can be combined with each other. In addition, the invention can be established independently for each of the distinctive features.

1. Double Container 1

Figure 3A:
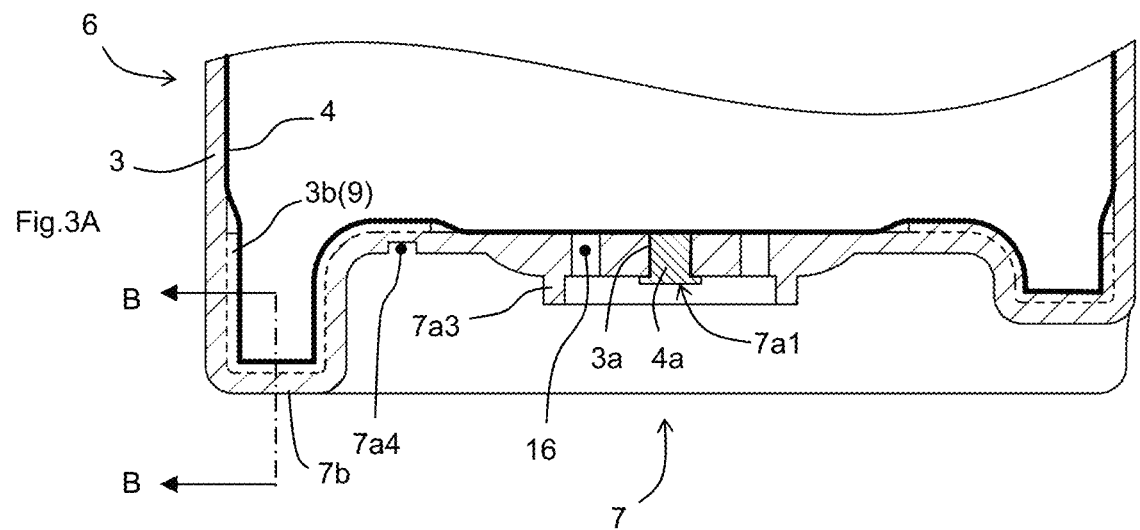
FIG. 3A is a cross-sectional view along an A-A line in FIG. 1B.
Figure 3B:
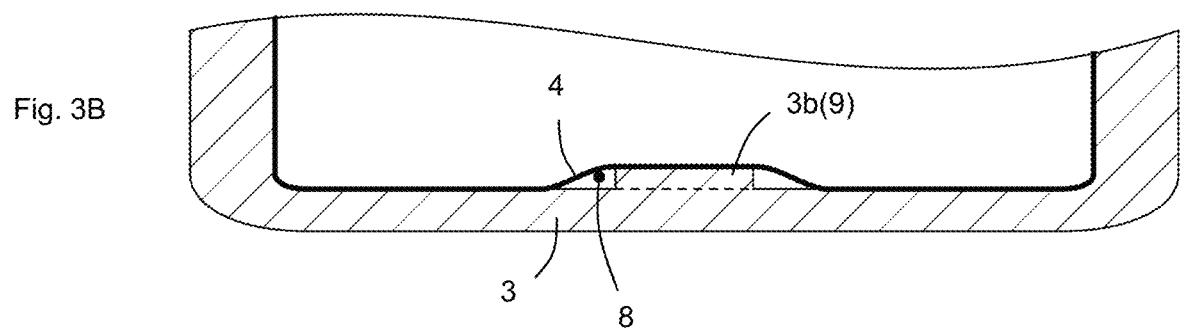
FIG. 3B is a cross-sectional view along a B-B line in FIG. 3A.

First, a double container 1 that can be manufactured by a method of manufacturing a double container of one embodiment of the present invention will be described. As shown in FIGS. 1A and 1B, the double container 1 that can be manufactured by the method of the present invention comprises a container body 2. As shown in FIG. 3A, the container body 2 has an outer shell 3 and an inner bag 4, and is configured such that the inner bag 4 contracts as content is reduced.

As shown in FIGS. 1A and 1B, the container body 2 has a mouth part 5, a body part 6, and a bottom part 7. The mouth part 5 comprises an engagement part 5a to which a mouth part attachment member such as a cap and a pump can be attached. The engagement part 5a is a male screw part when the mouth part attachment member is attached via screw structure, or a circumferentially protruding annular protrusion when the mouth part attachment member is attached via press-fit structure. The mouth part attachment member preferably has a check valve, which enables the content to be discharged but prevents outside air from flowing into the container body 2. The mouth part 5 is provided to extend from an upper end 6a of the body part 6. The mouth part 5 is cylindrical. The body part 6 has a larger outer diameter than the mouth part 5 (in the present specification, "outer diameter" means a diameter of a circumscribed circle, when the cross section is not circular).

The body part 6 is tubular, and the bottom part 7 is provided at the lower end of the body part 6 to close the lower end of the body part 6. The bottom part 7 comprises a central recessed part 7a provided in the center of the bottom part 7 and a peripheral part 7b surrounding the central recessed part 7a.

Figure 2A:
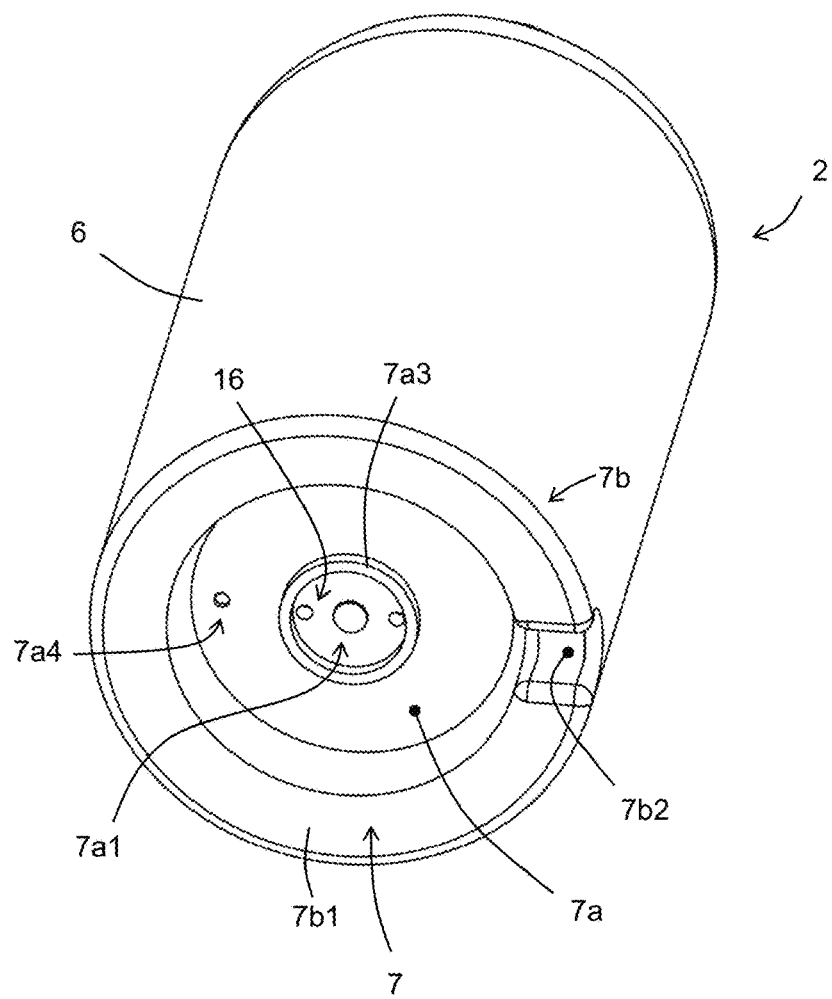
FIG. 2A is a perspective view of the container body 2 in FIG. 1 as viewed from a side of a bottom part 7.
Figure 2B:
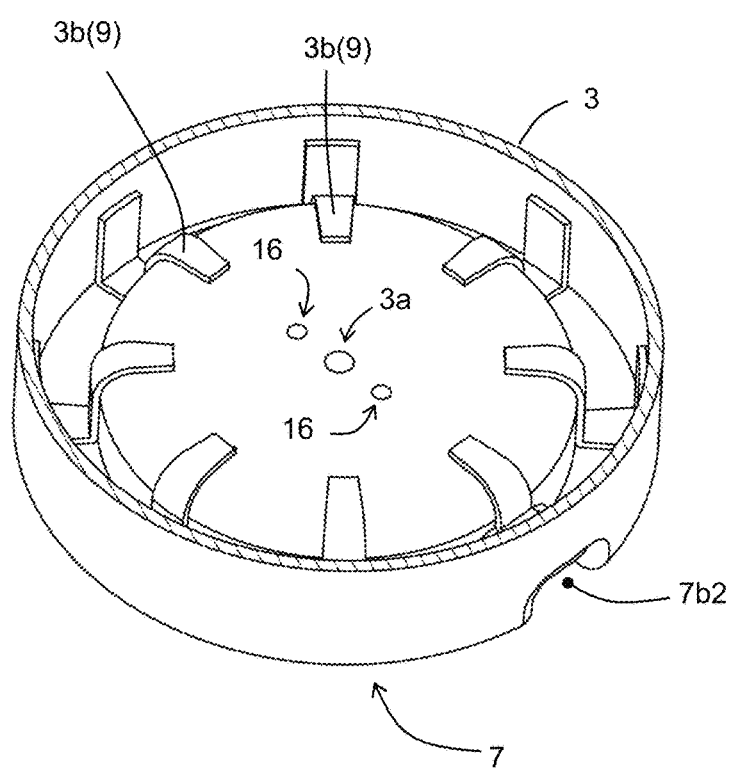
FIG. 2B is a cross-sectional perspective view of an area near the bottom part 7 of an outer shell 3 as viewed from an inside of the container.

As shown in FIG. 2A, the central recessed part 7a is provided with an engagement part 7a1, an outside air introduction hole 16, an annular protrusion part 7a3, and a positioning recessed part 7a4. As shown in FIG. 3A, the engagement part 7a1 is configured by inserting an engagement protrusion 4a provided on the inner bag 4 into an insertion hole 3a provided on the outer shell 3. Detachment of the inner bag 4 from the outer shell 3 is prevented by the engagement part 7a1. The outside air introduction hole 16 is a through-hole that passes through the outer shell 3, and outside air is introduced into the intermediate space between the outer shell 3 and the inner bag 4 through the outside air introduction hole 16 as the inner bag 4 contracts. The engagement part 7a1 and the outside air introduction hole 16 are arranged inside the annular protrusion part 7a3. The positioning recessed part 7a4 is used to position the container body 2 in the circumferential direction when printing or the like are performed on the container body 2.

The peripheral part 7b comprises a grounding part 7b1 and a peripheral recessed part 7b2. The grounding part 7b1 is the part that contacts the placement surface on which the container body 2 is placed when the container body 2 is erected. If the entire peripheral part 7b is defined as the grounding part 7b1, there is a possibility that the central recessed part 7a may become a closed space between the container body 2 and the placement surface when the container body 2 is erected, which may hinder the introduction of outside air through the outside air introduction hole 16. Therefore, the peripheral recessed part 7b2 is provided as a ventilation path to prevent the inside of the central recessed part 7a from becoming a closed space.

When the content inside the inner bag 4 is discharged by the pump attached to the mouth part 5, the inner bag 4 contracts and tends to detach from the outer shell 3. At this time, outside air is introduced into the space between the inner bag 4 and the outer shell 3 through the outside air introduction hole 16. When the outer shell 3 and the inner bag 4 are in close contact near the outside air introduction hole 16, outside air is less likely to be introduced into the intermediate space between the outer shell 3 and the inner bag 4. For this reason, in the present embodiment, a spacer 9 is arranged between the outer shell 3 and the inner bag 4. In the present embodiment, a protrusion 3b that protrudes from the outer shell 3 toward the inner bag 4 is provided as the spacer 9. When the spacer 9 is provided, a gap 8 is formed between the outer shell 3 and the inner bag 4 at the position adjacent to the spacer 9, making it easier for outside air to be introduced through the gap 8.

Incidentally, even when the spacer 9 is provided, there is a case where outside air is less likely to be introduced into the intermediate space due to the close contact between the outer shell 3 and the inner bag 4 near the outside air introduction hole 16. Therefore, in the manufacturing method described later, the close contact between the outer shell 3 and the inner bag 4 near the outside air introduction hole 16 is suppressed by devising the manufacturing condition.

The inner bag 4 and the outer shell 3 are preferably configured of a thermoplastic resin. In this case, the container body 2 can be efficiently manufactured by resin molding such as biaxial stretch blow molding or direct blow molding.

The thickness of the container body 2 is, for example, 400 to 1200 μm, and preferably 500 to 1000 μm. The thickness is, specifically for example, 400, 450, 500, 550, 600, 650, 700, 750, 800, 850, 900, 950, 1000, 1050, 1100, 1150, or 1200 μm, and may be in the range between the two values exemplified herein. The thickness of the inner bag 4 is, for example, 80 to 200 μm, and preferably 90 to 150 μm. The thickness is, specifically for example, 80, 90, 100, 110, 120, 130, 140, 150, 160, 170, 180, 190, or 200 μm, and may be in the range between the two values exemplified herein. The thickness of the outer shell 3 is, for example, 300 to 1000 μm, and preferably 400 to 800 μm. The thickness is, specifically for example, 300, 350, 400, 450, 500, 550, 600, 650, 700, 750, 800, 850, 900, 950, or 1000 μm, and may be in the range between the two values exemplified herein. It should be noted that the thicknesses of the container body 2, the inner bag 4, the outer shell 3, and each layer configuring these represent the thickness at the center in the height direction of the container body 2 unless otherwise specified.

Figure 4:
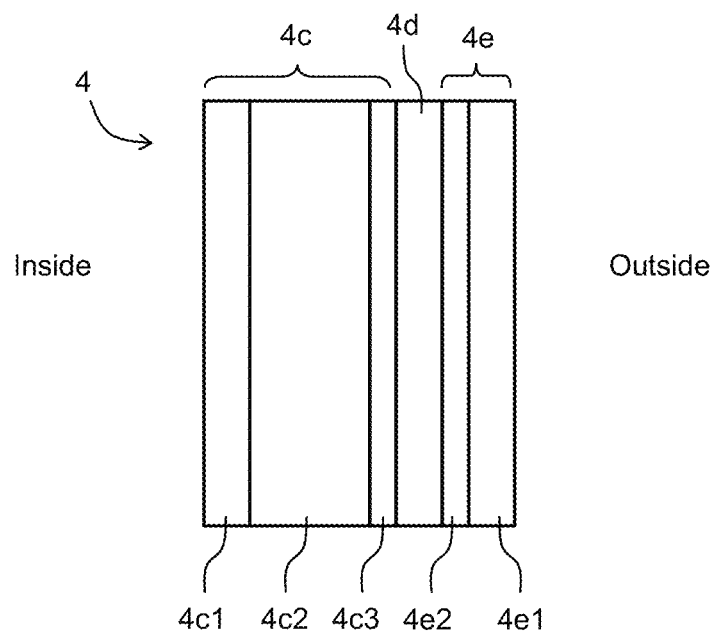
FIG. 4 shows an example of a layer configuration of an inner bag 4.

As shown in FIG. 4, in the first perspective, the inner bag 4 comprises an inner layer 4c, a gas barrier layer 4d, and an outer layer 4e in order from the inside of the inner bag 4. On the other hand, in the second and third perspectives, the layer configuration of the inner bag 4 is not particularly limited. It may be the same as or different from the configuration in the first perspective, and may be a single-layer configuration or a multilayer configuration.

The inner layer 4c is a layer that is arranged on the inner side of the inner bag 4 than the gas barrier layer 4d. By the inner bag 4 comprising the inner layer 4c, exposure of the gas barrier layer 4d to the moisture contained in the content is suppressed.

The thickness of the inner layer 4c is, for example, 5 to 60 μm, specifically for example, 5, 10, 15, 20, 25, 30, 35, 40, 45, 50, 55, or 60 μm, and may be in the range between the two values exemplified herein. Preferably, the inner layer 4c comprises an innermost layer 4c1, a repro layer 4c2, and an adhesive layer 4c3 in order from the inside of the inner bag 4.

The innermost layer 4c1 is preferably configured of a resin having an excellent moisture barrier property, such as polyolefin (e.g., polyethylene, polypropylene) or PET. The innermost layer 4c1 is a layer in contact with the content inside the inner bag 4, and is preferably configured of a new resin (hereinafter referred to as "virgin resin") that is not a recycled resin to suppress contamination of the content.

The repro layer 4c2 is configured of a resin containing a recycled resin, and is preferably configured of a mixed resin configured of a recycled resin and a virgin resin. By providing the repro layer 4c2, it is possible to reduce environmental impact and container manufacturing cost. The repro layer 4c2 can be omitted if unnecessary.

When the entire mixed resin is taken as 100 mass %, the mixed resin preferably contains 15 to 50 mass % (15, 20, 25, 30, 35, 40, 45, or 50 mass %) of the recycled resin and 50 to 85 mass % (50, 55, 60, 65, 70, 75, 80, or 85 mass %) of the virgin resin. The ratio of the recycled resin and the virgin resin may be in the range between the two values exemplified in parentheses. The recycled resin is a resin obtained by recycling the scrap generated during molding of the container body 2. Since the scrap includes all layers of the container body 2, the recycled resin is a mixture of resin compositions configuring each of all layers of the container body 2.

The adhesive layer 4c3 is configured of an adhesive resin. Examples of the adhesive resin include acid-modified polyolefin resins (e.g., maleic anhydride-modified polyethylene, maleic anhydride-modified polypropylene). By providing the adhesive layer 4c3, the adhesion between the layers adjacent to the adhesive layer 4c3 is improved.

The outer layer 4e is a layer that is arranged on the outer side of the inner bag 4 than the gas barrier layer 4d. By the inner bag 4 comprising the outer layer 4e, exposure of the gas barrier layer 4d to the moisture contained in outside air is suppressed.

The thickness of the outer layer 4e is, for example, 5 to 60 μm, specifically for example, 5, 10, 15, 20, 25, 30, 35, 40, 45, 50, 55, or 60 μm, and may be in the range between the two values exemplified herein. The outer layer 4e preferably comprises an outermost layer 4e1 and an adhesive layer 4e2 in order from the outside of the inner bag 4.

The outermost layer 4e1 is preferably configured of a resin having an excellent moisture barrier property, such as polyolefin (e.g., polyethylene, polypropylene) or PET. The outermost layer 4e1 is a layer exposed to the outside of the inner bag 4, and is preferably configured of the virgin resin to suppress contamination of the external environment.

Descriptions of the adhesive layer 4e2 is the same as those of the adhesive layer 4c3.

Preferably, the inner layer 4c has a larger thickness than the outer layer 4e. In this case, the gas barrier layer 4d can be more reliably protected from the moisture in the content. The value of (thickness of the inner layer 4c/thickness of the outer layer 4e) is preferably 1.1 to 3, for example. The value is, specifically for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, and may be in the range between the two values exemplified herein.

In the present embodiment, the thickness of the repro layer 4c2 can be made relatively large by making the thickness of the inner layer 4c larger than that of the outer layer 4e and by arranging the repro layer 4c2 in the inner layer 4c. However, the repro layer 4c2 may be provided in both the inner layer 4c and the outer layer 4e, or only in the outer layer 4e.

The gas barrier layer 4d is configured of a gas barrier resin. In the present specification, the gas barrier resin is a material having an oxygen permeability of less than 50 cc/(m²·24 hours·atm) in an environment at a temperature of 20° C. and relative humidity of 65% in a state of a film having a thickness of 20 µm. The oxygen permeability described above is, for example, 0 to 49 cc/(m²·24 hours·atm), specifically for example, 0.01, 0.1, 0.2, 0.5, 1, 2, 5, 10, 15, 20, 25, 30, 35, 40, 45, or 49 cc/(m²·24 hours·atm), and may be in the range between the two values exemplified herein, or may be equal to or less than any one of the values exemplified herein.

The value of (oxygen permeability at 20° C. and 100% RH)/(oxygen permeability at 20° C. and 40% RH) of the gas barrier resin is preferably 2 or greater, and more preferably 5 or greater. The greater this value, the lower the gas barrier property under high humidity, and the technological significance of applying the present invention is remarkable. The value is, for example, 2 to 10000, specifically for example, 2, 5, 10, 20, 50, 100, 200, 1000, or 10000, and may be in the range between the two values exemplified herein.

The gas barrier resin may be configured only of a resin having high gas barrier property such as EVOH or polyamide, or may be a mixed resin that is a mixture of the above-described resin and another resin. An adhesive resin can be cited as another resin. By blending the adhesive resin to the gas barrier layer 4d, the adhesive layers 4c3 and 4e2 can be omitted, and the number of layers configuring the inner bag 4 can be reduced.

The thickness of the inner bag 4 is preferably 80 to 200 µm, and the value of (the thickness of the gas barrier layer 4d/the thickness of the inner bag 4) is preferably 0.2 to 0.6. Since high flexibility is required for the inner bag 4, the thickness of the inner bag 4 needs to be 80 to 200 µm. In that case, if the value of (the thickness of the gas barrier layer 4d/the thickness of the inner bag 4) is set to around 5%, as in a general laminated container, the gas barrier layer 4d is likely to become too thin, making the gas barrier property insufficient. Therefore, in the present embodiment, the thickness of the inner bag 4 is 80 to 200 µm while the value of (the thickness of the gas barrier layer 4d/the thickness of the inner bag 4) is 0.2 to 0.6, thereby enabling to achieve both the flexibility and gas barrier property of the inner bag 4. The thickness of the gas barrier layer 4d is, for example, 20 to 100 µm, specifically for example, 20, 30, 40, 50, 60, 70, 80, 90, or 100 µm, and may be in the range between the two values exemplified herein.

The outer shell 3 is preferably configured of a thermoplastic resin such as polyolefin (e.g., polyethylene, polypropylene) or PET.

As shown in FIGS. 5 to 10B and FIGS. 15 to 17B, the container body 2 can be formed by heating a preform 15 and by performing biaxial stretch blow molding, the preform 15 configured by covering an inner preform 14 which is to become the inner bag 4 with an outer preform 13 which is to become the outer shell 3 (the preform may be referred to as "assembly"). The preform 15 shown in FIGS. 15 to 17B are variations of the preform 15 shown in FIGS. 5 to 10B.

As shown in FIGS. 5 and 15, the inner preform 14 has a bottomed tubular shape and comprises a mouth part 14a, a body part 14b, and a bottom part 14c. A flange 14a1 is provided at the opening end of the mouth part 14a. The bottom part 14c is provided to close the lower end of the body part 14b. A positioning pin 14c1 is provided on the bottom part 14c.

As shown in FIGS. 5 and 15, the outer preform 13 has a bottomed tubular shape and comprises a mouth part 13a, a body part 13b, and a bottom part 13c. The bottom part 13c is provided to close the lower end of the body part 13b. As shown in FIGS. 9 and 16, a radially arranged protrusions 13c1 are provided on the inner surface of the bottom part 13c of the outer preform 13. A positioning hole 13c2 and a through-hole 17 are provided on the bottom part 13c. As shown in FIGS. 10B and 17B, an annular protrusion part 13c4 is provided on the outer surface of the bottom part 13c. The positioning hole 13c2 and the through-hole 17 are arranged in the region inside the annular protrusion part 13c4. The outer preform 13 has a size capable of inserting the inner preform 14. Since the through-hole 17 becomes the outside air introduction hole 16 of the container body 2, the part where the through-hole 17 is provided becomes the outside air introduction hole formation part 41.

When forming the preform 15, the flange 14a1 is brought into contact with the opening end of the mouth part 13a and the positioning pin 14c1 is inserted into the positioning hole 13c2. This positions the inner preform 14 and the outer preform 13 against each other. In this state, the mouth parts 14a and 13a are opposed to each other, and the body parts 14b and 13b are opposed to each other.

The mouth parts 13a and 14a become a mouth part 15a of the preform 15, the body parts 13b and 14b become a body part 15b of the preform 15, and the bottom parts 13c and 14c become a bottom part 15c of the preform 15. Furthermore, as shown in FIG. 11, the body part 15b and the bottom part 15c become a stretched part 15d that is stretched in the molding step described later.

The inner preform 14 and the outer preform 13 can be formed by direct blow molding or injection molding of a thermoplastic resin such as polyester (e.g., PET) and polyolefin (e.g., polypropylene, polyethylene). The inner preform is preferably configured of a material having a larger mold shrinkage rate than the outer preform. In this case, a gap is formed between the outer shell 3 and inner bag 4 by molding shrinkage, thereby facilitating the introduction of outside air into the intermediate space between the outer shell 3 and the inner bag 4.

The mold shrinkage rate of the material configuring the inner preform 14 is, for example, 0.5 to 6%, for example, 0.5, 1.0, 1.5, 2.0, 2.5, 3.0, 3.5, 4.0, 4.5, 5.0, 5.5, or 6.0%, and may be in the range between the two values exemplified herein. The mold shrinkage rate of the material configuring the outer preform 13 is, for example, 0.1 to 3%, for example, 0.1, 0.2, 0.3, 0.4, 0.5, 0.6, 0.7, 0.8, 0.9, 1.0, 1.5, 2.0, 2.5, or 3.0%, and may be in the range between the two values exemplified herein. The difference in the mold shrinkage rate is, for example, 0.1 to 5.5%, for example, 0.1, 0.2, 0.3, 0.4, 0.5, 1.0, 1.5, 2.0, 2.5, 3.0, 3.5, 4.0, 4.5, 5.0, or 5.5%, and may be in the range between the two values exemplified herein. The mold shrinkage rate can be measured in accordance with JIS K7152-4.

In one example, the inner preform 14 is configured of polyolefin (e.g., polypropylene), and the outer preform 13 is configured of PET. Since the mold shrinkage rate of polyolefin is higher than that of PET, the gap is likely to be formed easily between the outer shell 3 and the inner bag 4 by such a resin configuration. In addition, by using different materials for the inner preform 14 and the outer preform 13, welding to each other during blow molding is suppressed.

The inner preform 14 is preferably formed by direct blow molding. Direct blow molding (blow molding with a tubular parison in a molten state) can make it easy to form the inner preform 14 having a laminated structure. The outer preform 13 is preferably formed by injection molding. In this case, since the through-hole 17 can be formed during injection molding, the time and labor in post-processing can be reduced.

When the inner preform 14 is formed by direct blow molding, a pinch-off part 14h is formed in the bottom part 14c of the inner preform 14 at the position where the parison is closed. Since the pinch-off part 14h is relatively weak in strength, when the part near the pinch-off part 14h is vigorously stretched during biaxial stretch blow molding, the pinch-off part 14h may cleave.

In one example, as shown in FIGS. 6A to 8B, the inner preform 14 has a multilayer configuration, and comprises an inner layer 14d, a gas barrier layer (e.g., EVOH layer) 14e, and an outer layer 14f, in order from the inside. The inner layer 14d, the gas barrier layer 14e, and the outer layer 14f are the layers corresponding to the inner layer 4c, the gas barrier layer 4d, and the outer layer 4e of the inner bag 4, respectively, and can be configured with the same material and layer ratio as those of the inner bag 4. The inner layer 14d and the outer layer 14f include the innermost layer and the outermost layer of the inner preform 14, respectively. The innermost layer and the outermost layer can be configured of polyolefin (e.g., polyethylene, polypropylene), PET, or the like. As shown in FIG. 8B, the gas barrier layer 14e is very thin at the pinch-off part 14h. When the part near the pinch-off part 14h is stretched during biaxial stretch blow molding, the gas barrier layer 14e may be thinner, or a pinhole may be formed in the gas barrier layer 14e, which may cause a problem such as the reduced gas barrier property.

Figure 7:
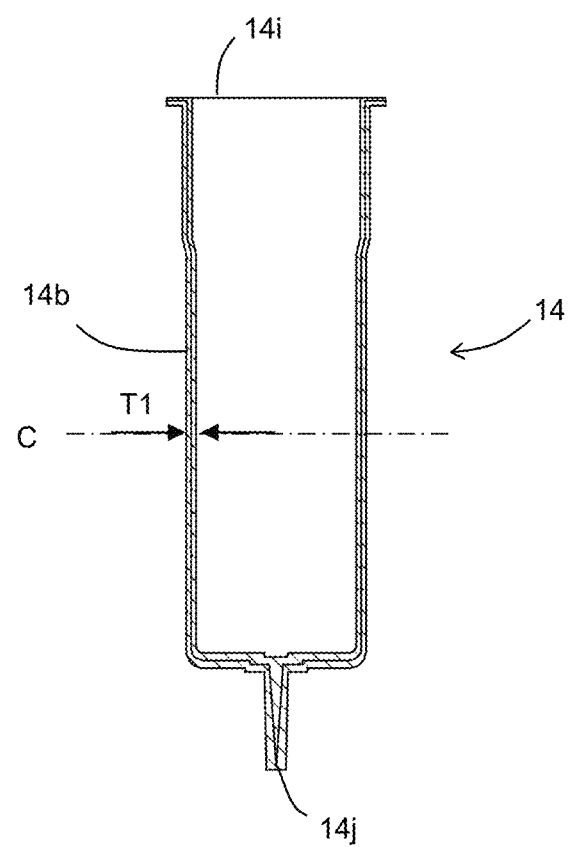
FIG. 7 is a cross-sectional view along an A-A line in FIG. 6B (cross-sectional view that passes through a center 14h1 in the longitudinal direction of a pinch-off part 14h and is perpendicular to the longitudinal direction of the pinch-off part 14h).

To solve the above-mentioned problem, if the thickness of the body 14b on the center surface C in the height direction of the inner preform 14 shown in FIG. 7 is defined as T1, and the thickness of the bottom part 14c at the middle point 14h3 between the center 14h1 and the end 14h2 in the longitudinal direction of the pinch-off part 14h when the inner preform 14 is viewed from the side of the bottom part 14c as shown in FIG. 6B (the thickness of the part where the pinch-off part 14h is provided in FIG. 8B) is defined as T2, it is preferable to adopt a configuration in which T2/T1>1 (preferably T2/T1≥1.2). This configuration means that the thickness of the bottom part 14c of the inner preform 14 is larger than that of the body part 14b. By increasing the thickness of the bottom part 14c, stretching of the bottom part 14c is suppressed, and as a result, stretching of the part near the pinch-off part 14h is also suppressed, thereby solving the above-mentioned problem.

The center surface C is a plane surface which passes through the center between an upper end surface 14i of the inner preform 14 and a lower end 14j on the cross-section passing through the center 14h1 in the longitudinal direction of the pinch-off part 14h and perpendicular to the longitudinal direction of the pinch-off part 14h, and is parallel to the upper end surface 14i, as shown in FIG. 7. The thickness T1 is the thickness of the inner preform 14 on the center surface C, and is preferably an average value of the thicknesses at a plurality of points in the circumferential direction. For example, the thickness T1 is the average value of the thicknesses at the points P1 and P2 arranged on the extension line of the pinch-off part 14h in the bottom view shown in FIG. 6B, and at the points P3 and P4 that pass through the center 14h1 and are arranged in the direction perpendicular to the longitudinal direction of the pinch-off part 14h.

T2/T1 is, for example, 1.05 to 3, specifically for example, 1.05, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, and may be in the range between the two values exemplified herein.

For example, the above-mentioned configuration can be achieved by making the thickness of the part configuring the bottom part 14c larger than those of the other parts in the parison formed when the inner preform 14 is direct blow molded.

At the middle point 14h3, when the protrusion amount of the pinch-off part 14h from the bottom part 14c is defined as T3, T3/T2 is preferably 0.5 or less. When this value is too large, the pinch-off part 14h contacts the inner surface of the outer preform 13 and the spacing between the inner preform 14 and the outer preform 13 becomes large, which may easily cause ununiform heating of the inner preform 14 in the heating step during biaxial stretch blow molding, or air may be easily accumulated between the inner bag 4 and the outer shell 3 of the container body 2 obtained by molding. T3/T2 is, for example, 0.01 to 0.5, specifically for example, 0.01, 0.05, 0.10, 0.15, 0.20, 0.25, 0.30, 0.35, 0.40, 0.45, or 0.50, and may be in the range between the two values exemplified herein.

The edge 14h2 of the pinch-off part 14h is preferably located outside the outer edge of the annular protrusion part 13c4. Since the stretching control effect by the annular protrusion part 13c4 is not exerted on the region outside the outer edge of the annular protrusion part 13c4, the inner preform 14 is easily stretched vigorously in this region, thereby easily causing the cleavage of the pinch-off part 14h. Therefore, when the edge 14h2 of the pinch-off part 14h is located outside the outer edge of the annular protrusion part 13c4, the technical significance of suppressing the stretching of the bottom part 14c by increasing the thickness of the bottom part 14c is remarkable.

2. Manufacturing Equipment 40

Hereinafter, a manufacturing equipment 40 that can be used for the method of manufacturing the double container 1 of one embodiment of the present invention will be described.

As shown in FIGS. 11 to 14 and FIGS. 18 to 21, the manufacturing equipment 40 comprises a mold unit 20 and a plurality of heaters 31. FIGS. 18 to 21 are the variations of FIGS. 11 to 14.

The plurality of heaters 31 are arranged to align along the longitudinal direction of the preform 15 at the position adjacent to the side surface of the preform 15 when the preform 15 is near the heater 31. Outputs of the plurality of heaters 31 are controllable independently from each other. Each heater 31 is preferably rod-shaped, extending in the direction perpendicular to the paper surface in FIGS. 11 and 18. As shown in FIG. 18, of the plurality of heaters 31, the one closest to the outside air introduction hole formation part 41 is referred to as a closest heater 31a, and the others are referred to as the other heaters 31b (31b1, 31b2, 31b3).

The mold unit 20 comprises a mouth part supporting mold 21, a bottom part supporting mold 22, and molding molds 23 and 24.

The mouth part supporting mold 21 is configured to be able to support the mouth part 13a of the outer preform 13. An insertion hole 21a is provided inside the mouth part supporting mold 21, and a supporting rod 25 is inserted into the insertion hole 21a. The supporting rod 25 can be extended and retracted by an unshown driving mechanism.

The mouth part supporting mold 21 is configured to be movable between the position A close to the heater 31 as shown in FIGS. 11 and 18, and the position B between the molds 23 and 24 as shown in FIGS. 12 and 19. For this reason, after performing the heating step of heating the preform 15 at the position A, the molding step of molding the preform 15 at the position B can be performed. The mouth part supporting mold 21 is configured to be able to rotate the preform 15 around the central axis of the mouth part 13a. By making the preform 15 close to the heater 31 while rotating the preform 15, it is possible to uniformly heat the entire circumference of the preform 15. Instead of moving the mouth part supporting mold 21, the heater 31 may be moved.

The bottom part supporting mold 22 is driven by the driving mechanism 22c and is configured to be movable in the longitudinal stretching direction (the vertical direction in FIGS. 12 to 14 and FIGS. 19 to 21). The molding molds 23 and 24 are openable and closable, and comprise cavity surfaces 23a and 24a, respectively. The cavity surfaces 23a and 24a are combined to form a cavity having a shape corresponding to the outer shape of the container body 2.

3. Method of Manufacturing Double Container 1

The method of manufacturing a double container 1 of one embodiment of the present invention comprises a biaxial stretch blow molding step. In the biaxial stretch blow molding step, the preform 15 is biaxially stretched by blowing air thereinto while the preform 15 is heated and softened. This step preferably comprises a heating step, a bottom part supporting step, a longitudinal stretching step, and a blowing step.

<Heating Step>

In the heating step, the preform 15 is heated and brought into a softened state. The heating step can be performed by heating the preform 15 with a plurality of heaters 31 while rotating the preform 15.

In one example, the preform 15 can be heated by making the preform 15 close to the heater 31 with the preform 15 attached to the mouth part supporting mold 21 as shown in FIGS. 11 and 18. Since the mouth part 15a of the preform 15 is covered by the mouth part supporting mold 21, the body part 15b and the bottom part 15c (i.e., the stretched part 15d) are heated.

Here, the value obtained by dividing the output Pa of the closest heater 31a by the square of the distance Da from the closest heater 31a to the outside air introduction hole formation part 41 (=Pa/(Da)$^2$) is defined as V, and the values obtained by dividing each output Pb (Pb1 to Pb3) of each heater 31b1 to 31b3 of the other heaters 31b by the square of each distance Db (Db1 to Db3) from each of the other heaters 31b1 to 31b3 to the preform 15 (=Pa/(Da)$^2$) are defined as W1 to W3 (=Pb/(Db)$^2$), the maximum value of W1 to W3 is defined as Wa, the average value of W1 to W3 is defined as Wb, and the minimum value of W1 to W3 is defined as Wc. Since the density of the energy radiated from the heater is inversely proportional to the square of the distance, the indexes V and W1 to W3, which indicate the heating degree of the preform 15, are calculated by dividing the output of the heater by the square of the distance.

It is preferred that the value of V is reduced and V/Wa is set to 0.60 or less such that the heating of the preform 15 at the outside air introduction hole formation part 41 is weakened. Examples of the method of reducing V include lowering the output Pa and increasing the distance Da. Since the heating of the preform at and near the outside air introduction hole formation part 41 is weakened when V/Wa is 0.60 or less, the degree of close contact between the outer shell 3 and the inner bag 4 near the outside air introduction hole 16 is reduced and outside air is smoothly introduced into the intermediate space through the outside air introduction hole 16. Furthermore, since the degree of close contact between the outer shell 3 and the inner bag 4 is not reduced except near the outside air introduction hole 16, the reduction in the capacity due to shrinkage of the inner bag 4 is suppressed. V/Wa is, for example, 0.10 to 0.60, for example, 0.10, 0.15, 0.20, 0.25, 0.30, 0.35, 0.40, 0.45, 0.50, 0.55, or 0.60, and may be in the range between the two values exemplified herein, or may be equal to or less than any one of the values exemplified herein.

From another perspective, V/Wb is preferably 0.70 or less. In this case, the effect that outside air is smoothly introduced into the intermediate space while shrinkage of the inner bag 4 is suppressed is also exerted. V/Wb is, for example, 0.10 to 0.70, for example, 0.10, 0.15, 0.20, 0.25, 0.30, 0.35, 0.40, 0.45, 0.50, 0.55, 0.60, 0.65, or 0.70, and may be in the range between the two values exemplified herein, or may be equal to or less than any one of the values exemplified herein.

From another perspective, V/Wc is preferably 0.95 or less. In this case, the effect that outside air is smoothly introduced into the intermediate space while shrinkage of the inner bag 4 is suppressed is also exerted. V/Wc is, for example, 0.10 to 0.95, for example, 0.10, 0.15, 0.20, 0.25, 0.30, 0.35, 0.40, 0.45, 0.50, 0.55, 0.60, 0.65, 0.70, 0.75, 0.80, 0.85, 0.90, or 0.95, and may be in the range between the two values exemplified herein, or may be equal to or less than any one of the values exemplified herein.

When the value of V is reduced as described above, the temperature of the outside air introduction hole formation part 41 becomes low. The temperature of the outside air introduction hole formation part 41 is preferably lower than that of the part of the stretched part 15d where the temperature is the highest, and more preferably lower than the average temperature of the entire stretched part 15d.

Before the heating step, the tip of the supporting rod 25 may be brought into contact with the inner bottom surface of the inner preform 14. This suppresses the softened preform 15 from rocking.

The heating temperature of the preform 15 is preferably lower than the melting point of the resin configuring the preform 15 to prevent the inner bag 4 from adhering to the outer shell 3. In the present specification, "melting point" means the melting peak temperature Tpm measured in accordance with JIS K 7121:2012.

<Bottom Part Supporting Step>

In the bottom part supporting step, the bottom part supporting mold 22 moves toward the bottom part 13c of the outer preform 13, and the bottom part supporting mold 22 supports the bottom part 13c of the outer preform 13, as shown in FIGS. 12 to 13 and FIGS. 19 to 20. The bottom part supporting mold 22 is provided with a recessed part 22a that can accommodate the annular protrusion part 13c4, and the bottom part supporting mold 22 preferably supports the bottom part 13c such that the annular protrusion part 13c4 is accommodated inside the recessed part 22a. This suppresses the annular protrusion part 13c4 and the inner region thereof from being stretched during the biaxial stretch blow molding step. The recessed part 22a is preferably annular. Besides, preferably, the bottom part supporting mold 22 comprises a recessed part 22b that can accommodate the positioning pin 14c1, and supports the bottom part 13c such that the positioning pin 14c1 is accommodated inside the recessed part 22b. This suppresses the positioning pin 14c1 from interfering with the bottom part supporting mold 22. FIGS. 13 and 20 show the state in which the molding molds 23 and 24 are closed. However, since the molding molds 23 and 24 can be closed at an arbitrary time point before the biaxial stretch blow molding step, they may be closed after the longitudinal stretching step.

<Longitudinal Stretching Step>

In the longitudinal stretching step, the preform 15 is stretched longitudinally (in the vertical direction in FIGS. 13 to 14 and FIGS. 20 to 21) by pressing the supporting rod 25 against the inner bottom surface of the inner preform 14 and extending it, as shown in FIGS. 13 to 14 and FIGS. 20 to 21. At this time, the bottom part supporting mold 22 is preferably retracted in synchronization with the extension of the supporting rod 25. This allows the preform 15 to be stretched stably. The bottom part supporting step may be performed after the longitudinal stretching step because the longitudinal stretching step can also be performed without supporting the bottom part 13c with the bottom part supporting mold 22. In addition, a recessed part fitted with the supporting rod may be provided on the inner bottom surface of the inner preform 14 such that the supporting rod can be easily fixed to the inner preform 14.

<Blowing Step>

In the blowing step, air is blown into the inner preform 14 from the state shown in FIGS. 14 and 20 to stretch (i.e., expand) the preform 15 laterally and shape it into the shape of cavity surfaces 23a and 24a. Air can be blown in through a ventilation path 26 between the mouth part supporting mold 21 and the supporting rod 25. However, for example, a ventilation path may be provided inside the supporting rod 25 and air may be blown out of the side surface of the supporting rod 25.

In the present embodiment, since air is blown in with the bottom part 13c of the outer preform 13 being supported by the bottom part supporting mold 22, the stretching of the bottom part 13c of the outer preform 13 is suppressed.

The blowing step can be performed simultaneously with the longitudinal stretching step. In other words, air may be blown into the inner preform 14 with the preform 15 being stretched longitudinally. Furthermore, the longitudinal stretching step may be omitted and air may be blown after the bottom part supporting step, without stretching the preform 15 longitudinally.

The preform 15 is expanded by biaxial stretch blow molding, to thereby obtain the container body 2 shown in FIGS. 1A to 3B. The mouth parts 13a and 14a become the mouth part 5, the body parts 13b and 14b become the body part 6, and the bottom parts 13c and 14c become the bottom part 7. The protrusion 13c1, the annular protrusion part 13c4 and the through-hole 17 become the protrusion 3b, the annular protrusion part 7a3 and the outside air introduction hole 16, respectively. During blow molding, the mouth parts 13a and 14a, and the annular protrusion part 13c4 and the inner region thereof are hardly deformed, and other parts are mainly deformed. Since the through-hole 17 is arranged in the inner region of the annular protrusion part 13c4, it is suppressed from being deformed and closed during blow molding.

In addition, since the thickness of the bottom part 14c of the inner preform 14 is large, stretching of the bottom part 14c of the inner preform 14 is suppressed, thereby suppressing the pinch-off part 14h from cleaving. The flange 14a1 becomes a flange 4b covering the opening end of the mouth part 5 of the container body 2, as shown in FIG. 1A.

After blow molding, the positioning hole 13c2 becomes the insertion hole 3a shown in FIG. 3A, and the positioning pin 14c1 is inserted into the insertion hole 3a. The positioning pin 14c1 is then deformed (i.e., crushed or bent) to become the engagement protrusion 4a shown in FIG. 3A. The engagement part 7a1 of the container body 2 is thereby configured.

4. Other Embodiments (First to Third Perspectives)

In the above-described embodiment, the through-hole 17 provided on the outer preform 13 is configured to become the outside air introduction hole 16 after blow molding, but the outside air introduction hole 16 may be formed by perforating the perforated part of the outer shell 3 after blow molding, without providing a through-hole on the outer preform 13 at the part which is to become the outside air introduction hole 16. In this case, the outside air introduction hole formation part 41 is the part to become the perforated part of the outer shell 3.

In the above-described embodiment, the outside air introduction hole 16 is formed in the bottom part 7 of the container body 2, but the outside air introduction hole 16 may be formed in the body part 6.

In the above-described embodiment, the spacer 9 is provided radially, but the spacer 9 may be in a different shape. The spacer 9 may be configured of protrusions protruding from the inner bag 4, or a different material. The spacer 9 may be omitted.

(First Perspective)

In the above-described embodiment, the case of manufacturing the container body 2 by biaxial stretch blow molding is explained as an example, but the container body 2 may be manufactured by direct blow molding. In this case, the resin configuring the outermost layer of the inner bag 4 and the resin configuring the innermost layer of the outer shell 3 are preferably selected such that they do not adhere to each other to prevent adhesion of the inner bag 4 and the outer shell 3.

(Second Perspective)

In the above-described embodiment, the inner preform 14 has a multilayer configuration, but it may have a single-layer configuration.

The preform 15 is composed of two bodies of the outer preform 13 and the inner preform 14, but may be composed of single body. In this case, for example, the preform 15 can have the same manufacturing method and thickness configuration as the inner preform 14, and the same mouth part 13a as the outer preform 13. In this case, a single-layer container is obtained.

(Third Perspective)

When the outside air introduction hole 16 is formed on the body part 6, the outside air introduction hole formation part 41 is located in the body part 13b of the outer preform 13. In addition, any one of the heaters located adjacent to the body part 13b of the outer preform 13, such as heaters 31b1 to 31b3, becomes the closest heater, and the others become the other heaters. In this case, the through-hole 17 that is to become the outside air introduction hole 16 may or may not be formed on the body part 13b. Preferably, the spacer 9 is provided at a position adjacent to the outside air introduction hole formation part 41.

EXAMPLES (Third Perspective)

The container body 2 (having a capacity of 300 mL) shown in FIGS. 1A to 3B was manufactured by biaxially stretch blow molding of the outer preform 13 and the inner preform 14 shown in FIGS. 15 to 17B using the manufacturing equipment 40 shown in FIGS. 18 to 21 in accordance with the method described above. The outputs of heaters Pa, Pb and the distances Da, Db in the heating step were set as shown in Table 1 to manufacture the container body 2 in Examples and Comparative Example. The rotational speed of the preform 15 in the heating step was 70 rpm. The cross-sectional diameter of each heater was 15 mm. The vertical pitch of adjacent heaters was 17.5 mm, and the diameter of the body part 15b of the preform 15 was 30 mm.

Next, after the container body 2 was fully filled with content (water), a pump having a check valve was attached to the mouth part 5, and the content was discharged by operating the pump. After 30 mL of content was discharged, the condition of the outer shell 3 was visually checked, and the outside air introduction property was evaluated in accordance with the following criteria.

A: The outer shell 3 is not shrunk

X: The outer shell 3 is shrunk

As shown in Table 1, for the double containers with V/Wa of 0.60 or less in Examples, outside air was smoothly introduced into the intermediate space between the outer shell 3 and the inner bag 4. On the other hand, for the double container with V/Wa exceeding 0.60 in Comparative Example, outside air was not smoothly introduced into the intermediate space between the outer shell 3 and the inner bag 4.

TABLE 1

|  |  | Examples | | Comparative Example |
|---|---|---|---|---|
|  |  | 1 | 2 | 1 |
| Closest Heater 31a | Output Pa(W) | 35 | 35 | 49 |
|  | Distance Da (mm) | 23 | 23 | 23 |
|  | V (=Pa/(Da)$^2$) | 0.066 | 0.066 | 0.093 |
| Other Heater 31b1 | Output Pb1 (W) | 36 | 36 | 36 |
|  | Distance Db1 (mm) | 20 | 20 | 20 |
|  | W1 (=Pb1/(Db1)$^2$) | 0.090 | 0.090 | 0.090 |
| Other Heater 31b2 | Output Pb2(W) | 46 | 46 | 46 |
|  | Distance Db2(mm) | 20 | 20 | 20 |
|  | W2 (=Pb2/(Db2)$^2$) | 0.115 | 0.115 | 0.115 |
| Other Heater 31b3 | Output Pb3(W) | 50 | 55 | 55 |
|  | Distance Db3(mm) | 20 | 20 | 20 |
|  | W3 (=Pb3/(Db3)$^2$) | 0.125 | 0.138 | 0.138 |
| Wa (Maximum Value of W1 to W3) | | 0.125 | 0.138 | 0.138 |
| Wb (Average Value of W1 to W3) | | 0.110 | 0.114 | 0.114 |
| Wc (Minimun Value of W1 to W3) | | 0.090 | 0.090 | 0.090 |
| V/Wa | | 0.53 | 0.48 | 0.67 |
| V/Wb | | 0.60 | 0.58 | 0.81 |
| V/Wc | | 0.74 | 0.74 | 1.03 |
| Outside Air Introduction Property | | A | A | X |

REFERENCE SIGN LIST

1: double container, 2: container body, 3: outer shell, 3a: insertion hole, 3b: protrusion, 4: inner bag, 4a: engagement protrusion, 4b: flange, 4c: inner layer, 4c1: innermost layer, 4c2: repro layer, 4c3: adhesive layer, 4d: gas barrier layer, 4e: outermost layer, 4e1: outermost layer, 4e2: adhesive layer, 5: mouth part, 5a: engagement part, 6: body part, 6a: upper end, 7: bottom part, 7a: central recessed part, 7a1: engagement part, 7a3: annular protrusion part, 7a4: positioning recessed part, 7b: peripheral part, 7b1: grounding part, 7b2: peripheral recessed part, 8: gap, 9: spacer, 13: outer preform, 13a: mouth part, 13b: body part, 13c: bottom part, 13c1: protrusion, 13c2: positioning pin, 13c4: annular protrusion part, 14: inner preform, 14a: mouth part, 14a1: flange, 14b: body part, 14c: bottom part, 14c1: positioning pin, 14d: inner layer, 14e: gas barrier layer, 14f: outer layer, 14h: pinch-off part, 14h1: center, 14h2: end, 14h3: middle point, 14i: upper end surface, 14j: lower end, 15: preform, 15a: mouth part, 15b: body part, 15c: bottom part, 15d: stretched part, 16: outside air introduction hole, 17: through-hole, 20: mold unit, 21: mouth part supporting mol, 21a: insertion hole, 22: bottom part supporting mold, 22a: recessed part, 22b: recessed part, 22c: driving mechanism, 23: molding mold, 23a: cavity surface, 24: molding mold, 24a: cavity surface, 25: supporting rod, 26: ventilation path, 31: heater, 31a: closest heater, 31b: other heaters, 31b1: other heater, 31b2: other heater, 31b3: other heater, 40: manufacturing equipment, 41: outside air introduction hole formation part, C: center surface, D: region, Da: distance, Db: distance, Pa: output, Pb: output, T1: thickness, Tpm: melting peak temperature

The invention claimed is:

1. A method of manufacturing a container, the method comprising a biaxial stretch blow molding step for biaxially stretching a preform by blowing air thereinto with the preform being heated and softened in the biaxial stretch blow molding step, wherein:

the preform has a tubular body part and a bottom part closing a lower end of the body part;

the preform comprises a pinch-off part at the bottom part,

T2/T1 is greater than 1, where T1 represents a thickness of the body part on a center surface in a height direction of the preform, and T2 represents a thickness of the bottom part at a middle point between a center and an end in a longitudinal direction of the pinch-off part when the preform is viewed along a longitudinal direction of the preform from a side of the bottom part, and at the middle point, when a protrusion amount of the pinch-off part from the bottom part is defined as T3, T3/T2 is 0.4 or less.

2. The method of claim 1, wherein:

the preform comprises an innermost layer, a gas barrier layer, and an outermost layer, in order from an inside of the preform.

3. The method of claim 1, wherein:

the thickness of a part in the bottom part except for the pinch-off part is greater than the thickness of the body part.

4. The method of claim 1, wherein:

T2/T1 is equal to or greater than 1.2; and at the middle point, when a protrusion amount of the pinch-off part from the bottom part is defined as T3, T3/T2 is 0.15 or less.

5. The method of claim 1, wherein T2/T1 is equal to or greater than 1.2.

6. A method of manufacturing a container, the method comprising a biaxial stretch blow molding step for biaxially stretching a preform that is configured by covering an inner preform with an outer preform by blowing air thereinto with the preform being heated and softened in the biaxial stretch blow molding step;

the inner preform has a tubular body part and a bottom part closing a lower end of the body part;

the inner preform comprises a pinch-off part at the bottom part,

T2/T1 is greater than 1, where T1 represents a thickness of the body part on a center surface in a height direction of the inner preform, and T2 represents a thickness of the bottom part at a middle point between a center and an end in a longitudinal direction of the pinch-off part when the inner preform is viewed along a longitudinal direction of the inner preform from a side of the bottom part, and at the middle point, when a protrusion amount of the pinch-off part from the bottom part is defined as T3, T3/T2 is 0.4 or less.

7. The method of claim 6, wherein:
the inner preform comprises an innermost layer, a gas barrier layer, and an outermost layer, in order from an inside of the inner preform.

8. The method of claim 6, wherein:
the thickness of a part in the bottom part except for the pinch-off part is greater than the thickness of the body part.

9. The method of claim 6, wherein:
T2/T1 is equal to or greater than 1.2; and
at the middle point, when a protrusion amount of the pinch-off part from the bottom part is defined as T3, T3/T2 is 0.15 or less.

10. The method of claim 6, wherein T2/T1 is equal to or greater than 1.2.

11. A method of manufacturing a container, the method comprising a biaxial stretch blow molding step for biaxially stretching a preform that is configured by covering an inner preform with an outer preform by blowing air thereinto with the preform being heated and softened in the biaxial stretch blow molding step;
the inner preform has a tubular body part and a bottom part closing a lower end of the body part;
the inner preform comprises a pinch-off part at the bottom part,
T2/T1 is greater than 1, where T1 represents a thickness of the body part on a center surface in a height direction of the inner preform, and T2 represents a thickness of the bottom part at a middle point between a center and an end in a longitudinal direction of the pinch-off part when the inner preform is viewed along a longitudinal direction of the inner preform from a side of the bottom part, and
the outer preform comprises an annular protrusion part at a bottom part of the outer preform; and
an end of the pinch-off part is located outside an outer edge of the annular protrusion part.

* * * * *